United States Patent
Cook et al.

(10) Patent No.: US 11,900,432 B2
(45) Date of Patent: *Feb. 13, 2024

(54) SYSTEM FOR CUSTOMIZING ARTICLES OF FOOTWEAR

(71) Applicant: NIKE, Inc., Beaverton, OR (US)

(72) Inventors: Christopher S. Cook, Portland, OR (US); Shane S. Kohatsu, Portland, OR (US); Bret Schoolmeester, Banks, OR (US); Daniel T. Rowe, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 181 days.

This patent is subject to a terminal disclaimer.

(21) Appl. No.: 17/377,962

(22) Filed: Jul. 16, 2021

(65) Prior Publication Data

US 2021/0342910 A1 Nov. 4, 2021

Related U.S. Application Data

(63) Continuation of application No. 16/018,878, filed on Jun. 26, 2018, now Pat. No. 11,093,989, which is a
(Continued)

(51) Int. Cl.
*G06Q 30/00* (2023.01)
*G06Q 30/0601* (2023.01)
(Continued)

(52) U.S. Cl.
CPC ......... *G06Q 30/0621* (2013.01); *A43B 3/126* (2013.01); *A43B 3/26* (2013.01);
(Continued)

(58) Field of Classification Search
CPC ..... A43B 13/186; A43B 13/026; A43B 13/04; A43B 13/125; A43B 13/181; A43B 13/188; A43B 7/144; G06Q 30/0621; A43D 1/02

See application file for complete search history.

(56) References Cited

U.S. PATENT DOCUMENTS 5,042,175 A * 8/1991 Ronen ............... A43B 13/182
36/43
6,238,049 B1 5/2001 Griffin et al.
(Continued)

FOREIGN PATENT DOCUMENTS

CA 2811524 A1 * 3/2012 ............ A43D 1/02
CN 102177525 A 9/2011
(Continued)

OTHER PUBLICATIONS

Boer, Claudio R., and Sergio Dulio. "Footwear Mass Customization in Practice." Mass Customization and Footwear: Myth, Salvation or Reality? (2007): 39-151 (Year: 2007).*
(Continued)

*Primary Examiner* — Matthew E Zimmerman
(74) *Attorney, Agent, or Firm* — Banner & Witcoff, Ltd.

(57) ABSTRACT

Methods of manufacturing articles of footwear include providing articles to a customer, receiving evaluations of one or more structural characteristics of the articles, and making new customized articles for the customer based on the evaluations of one or more structural characteristics. The method can be conducted as a cycle that is repeated each time the customer buys a new pair of footwear. Systems for manufacturing customized articles of footwear include: a computing system that receives input including a customer-selected evaluation of one or more structural characteristics of an article of footwear, wherein the article of footwear includes a first sole member with a first structural characteristic having a first value; and a second sole member for a second article of footwear, wherein a surface of the second sole member is modified to include a first pattern of apertures and/or incisions based on the customer-selected evaluation of the first structural characteristic.

18 Claims, 21 Drawing Sheets

Related U.S. Application Data continuation of application No. 15/055,016, filed on Feb. 26, 2016, now Pat. No. 10,032,202.

(51) Int. Cl.

| | | |
|---|---|---|
| *A43B 7/14* | (2022.01) | |
| *A43B 13/14* | (2006.01) | |
| *A43B 3/26* | (2006.01) | |
| *A43B 13/18* | (2006.01) | |
| *A43D 1/02* | (2006.01) | |
| *A43B 3/12* | (2006.01) | |

(52) U.S. Cl.
CPC ............... *A43B 7/14* (2013.01); *A43B 13/14* (2013.01); *A43B 13/141* (2013.01); *A43B 13/181* (2013.01); *A43D 1/02* (2013.01)

(56) References Cited

U.S. PATENT DOCUMENTS

| | | |
|---|---|---|
| 6,880,266 B2 | 4/2005 | Schoenborn et al. |
| 7,216,092 B1 | 5/2007 | Weber et al. |
| 8,266,546 B2 | 9/2012 | Candrian et al. |
| 8,959,797 B2 | 2/2015 | Lyden |
| 8,994,826 B2 | 3/2015 | Bentley |
| 9,078,491 B2 | 7/2015 | Cook |
| 9,460,557 B1 | 10/2016 | Tran et al. |
| 9,867,425 B2 | 1/2018 | Cook et al. |
| 10,032,202 B2 | 7/2018 | Cook et al. |
| 10,117,478 B2 | 11/2018 | Cook et al. |
| 10,194,712 B2 | 2/2019 | Cook et al. |
| 10,582,740 B2 | 3/2020 | Cook et al. |
| 10,798,994 B2 | 10/2020 | Cook et al. |
| 10,977,705 B2 | 4/2021 | Cook et al. |
| 11,093,989 B2 | 8/2021 | Cook et al. |
| 2003/0110095 A1 | 6/2003 | Danenberg |
| 2004/0133431 A1* | 7/2004 | Udiljak ............... A43B 17/00 705/26.1 |
| 2005/0071935 A1* | 4/2005 | Shah ................. A43D 1/025 12/146 L |
| 2006/0287877 A1 | 12/2006 | Wannier et al. |
| 2007/0011173 A1 | 1/2007 | Agostino |
| 2007/0043582 A1 | 2/2007 | Peveto et al. |
| 2012/0042539 A1 | 2/2012 | Miner |
| 2012/0203659 A1 | 8/2012 | Langvin |
| 2013/0110666 A1 | 5/2013 | Aubrey |
| 2013/0167405 A1 | 7/2013 | Forsey |
| 2014/0020192 A1 | 1/2014 | Jones et al. |
| 2014/0180866 A1 | 6/2014 | Gonzales |
| 2014/0188863 A1 | 7/2014 | Grauman et al. |
| 2014/0196308 A1* | 7/2014 | Baratta ............... A43B 13/206 12/146 B |
| 2014/0268060 A1 | 9/2014 | Lee et al. |
| 2014/0277663 A1* | 9/2014 | Gupta ................. G06Q 50/04 700/98 |
| 2015/0040428 A1 | 2/2015 | Davis et al. |
| 2015/0058169 A1 | 2/2015 | Arayama |
| 2015/0193560 A1 | 7/2015 | Spector |
| 2015/0242929 A1* | 8/2015 | Wilkinson ............ A43D 3/024 705/26.7 |
| 2016/0374431 A1 | 12/2016 | Tow |
| 2017/0150764 A1 | 6/2017 | Meloni |
| 2020/0163410 A1 | 3/2020 | Cook et al. |
| 2021/0030110 A1 | 2/2021 | Cook et al. |
| 2021/0192593 A1 | 6/2021 | Cook et al. |

FOREIGN PATENT DOCUMENTS

| | | |
|---|---|---|
| CN | 103955849 A | 7/2014 |
| CN | 103996123 A | 8/2014 |
| CN | 104484813 A | 4/2015 |
| CN | 104679857 A | 6/2015 |
| CN | 104899299 A | 9/2015 |
| CN | 105184637 A | 12/2015 |
| KR | 20140146737 A | 12/2014 |
| KR | 20160080615 A | 7/2016 |
| WO | 2009014964 A1 | 1/2009 |

OTHER PUBLICATIONS

Jun. 14, 2017—(WO) International Search Report and Written Opinion—App PCT/US2017/019646.

Cecilia Brennan, "Orthotic Recalls: Do you need to have your orthotics reassessed or refurbished?" http://www.sportsandspinalphysio.com.au/orthotic-recalls/ XP055375489 Jul. 30, 2015.

Divert, C & Momieux, Guillaume & Baur, Heiner & Mayer, Frank & Belli, Alain. (2005) Mechanical Comparison of Barefoot and Shod Running. International Journal of Sports Medicine, 26. 593-8. 10.1055/s-2004-821327.(Year 2004).

Nov. 8, 2023—(EP) Communication with European Search Report—U.S. Appl. No. 23/186,507, 8 pages.

* cited by examiner

SYSTEM FOR CUSTOMIZING ARTICLES OF FOOTWEAR

RELATED APPLICATION DATA

This application is: (a) a continuation of U.S. patent application Ser. No. 16/018,878 filed Jun. 26, 2018 and entitled "Method of Customizing Articles of Footwear," which application is (b) a continuation of U.S. patent application Ser. No. 15/055,016 filed Feb. 26, 2016 and entitled "Method of Customizing Articles of Footwear" (now U.S. Pat. No. 10,032,202 B2 issued Jul. 24, 2018). Each of U.S. patent application Ser. No. 16/018,878 and U.S. patent application Ser. No. 15/055,016 is entirely incorporated herein by reference.

BACKGROUND

The present embodiments relate generally to articles of footwear, and in particular to methods of customizing articles of footwear.

Articles of footwear generally include two primary elements: an upper and a sole structure. The upper may be formed from a variety of materials that are stitched or adhesively bonded together to form a void within the footwear for comfortably and securely receiving a foot. The sole structure is secured to a lower portion of the upper and is generally positioned between the foot and the ground. In many articles of footwear, including athletic footwear styles, the sole structure often incorporates an insole, a midsole, and an outsole.

SUMMARY

In one embodiment, a method of manufacturing articles of footwear includes steps of manufacturing a first article of footwear having a first sole with a structural characteristic having a first value and selling the first article of footwear to a customer, the customer having customer identification information. The method also includes designating the first article of footwear as being owned by the customer having the customer identification information. The method also includes providing an evaluation system for evaluating one or more structural characteristics of the article of footwear and receiving a customer-selected evaluation of the first value of the structural characteristic, and also designating the customer-selected evaluation as being received from the customer having the customer identification information. The method further includes manufacturing a second article of footwear having a second sole with the structural characteristic having a second value that is different from the first value, where the second value of the structural characteristic is determined by the customer-selected evaluation of the first value of the structural characteristic in the first article of footwear. The method also includes selling the second article of footwear to the customer and designating the second article of footwear as being owned by the customer having customer identification information.

In another embodiment, a method of manufacturing articles of footwear includes steps of manufacturing a first article of footwear having a first sole with a structural characteristic having a first value and providing the first article of footwear to a customer, the customer having customer identification information. The method also includes designating the first article of footwear as being owned by the customer having the customer identification information, providing an evaluation system for evaluating one or more structural characteristics of the article of footwear, instructing the customer to wait at least a predetermined time period after receiving the first article of footwear before submitting any evaluations of the first article of footwear and receiving a customer-selected evaluation of the first value of the structural characteristic, the customer-selected evaluation being received after the predetermined time period. The method also includes designating the customer-selected evaluation as being received from the customer having the customer identification information. The method also includes manufacturing a second article of footwear having a second sole with the structural characteristic having a second value that is different from the first value, where the second value of the structural characteristic is determined by the customer-selected evaluation of the first value of the structural characteristic in the first article of footwear. The method also includes providing the second article of footwear to the customer and designating the second article of footwear as being owned by the customer having customer identification information.

In another aspect, a method of manufacturing an article of footwear includes steps of assembling a first upper with a first sole so that the first upper is permanently joined with the first sole to form a first article of footwear, the first sole comprising a structural characteristic having a first value. The method also includes steps of providing the first article of footwear to a customer, the customer having customer identification information, designating the first article of footwear as being owned by the customer having the customer identification information, providing an evaluation system for evaluating one or more structural characteristics of the article of footwear and receiving a customer-selected evaluation of the first value of the structural characteristic. The method also includes designating the customer-selected evaluation as being received from the customer having the customer identification information, assembling a second upper with a second sole so that the second upper is permanently joined with the second sole to form a second article of footwear, the second sole comprising a structural characteristic having a second value. The method also includes providing the second article of footwear to the customer and designating the second article of footwear as being owned by the customer having the customer identification information.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
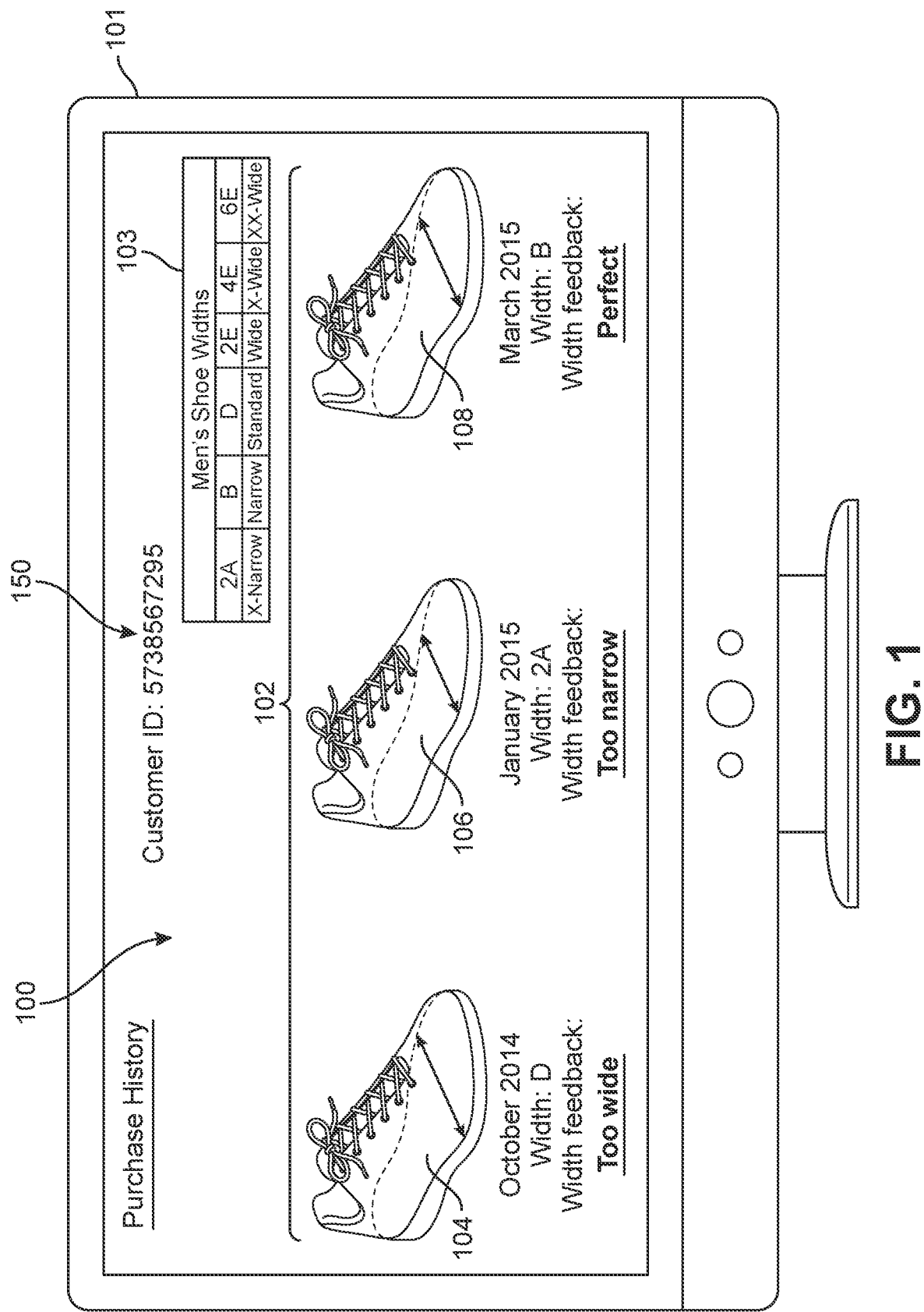
FIG. 1 is a schematic view of a purchase history for a customer displayed on a screen, according to an embodiment.

FIG. 1 is a schematic view of user-interface 100 (shown on display 101 of a computing system) depicting the purchasing history of a customer or user. Throughout this detailed description the terms "customer" and "user" may be used interchangeably. Specifically, the purchasing history of three different articles of footwear 102 are shown on a purchase history screen in a web browser, corresponding with three different purchase dates: October 2014, January 2015, and March 2015. Each article of footwear (or pair of footwear) is associated with various customization information, including in this exemplary case, an article "width" and "width feedback" (i.e., feedback from a user about the width of the article). For example, first article 104 is indicated as having width D and the width feedback is given as "too wide." Likewise, second article 106 is indicated as having width 2A and the width feedback is given as "too narrow." Finally, third article 108 is indicated as having width B and the width feedback is given as "perfect."

Here it may be understood that the feedback shown in the purchase history corresponds to feedback provided by a user or customer after the customer has had a chance to use the article for a substantial period of time. Moreover, as discussed in further detail below, this exemplary purchase history may correspond to an ongoing process or method whereby subsequent articles of footwear purchased by a user are customized according to feedback received about a previous article. Thus, the "too wide" feedback received for first article 104 having width D results in the manufacturer providing a subsequent second article 106 with width 2A (significantly narrower than width D, as seen in chart 103). Likewise, after receiving "too narrow" feedback regarding second article 106, the manufacturer provides a subsequent third article 108 with width 2B, which is narrower than width D, but wider than width 2A. Systems and methods for accomplishing such a "customization cycle" are discussed in further detail below and illustrated in FIGS. 2-16.

Figure 2:
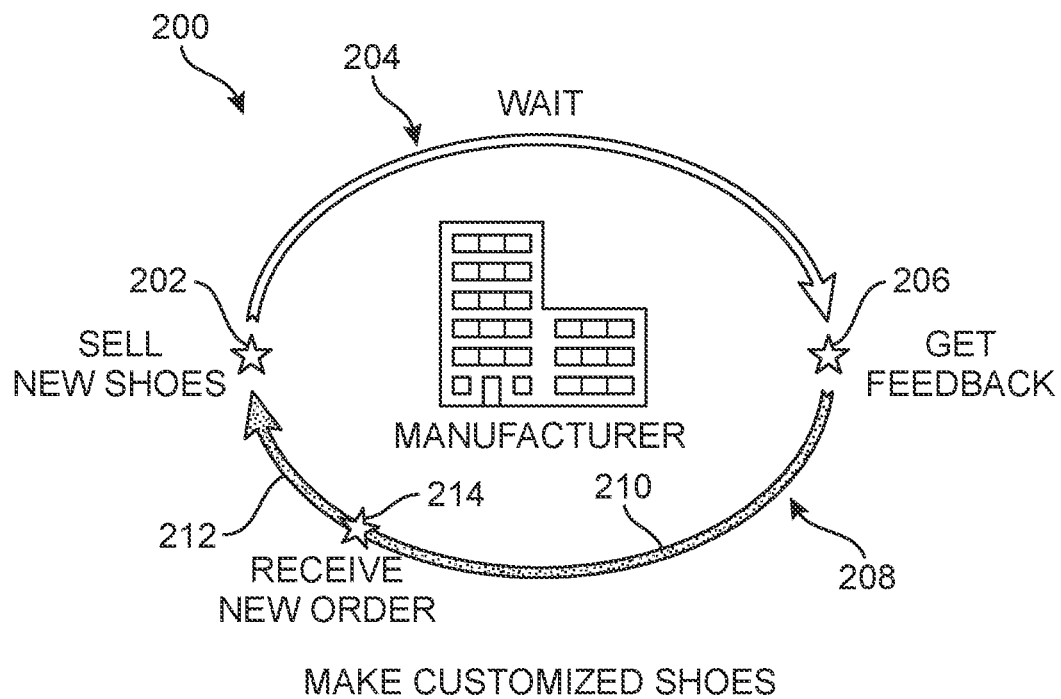
FIG. 2 is a schematic view of an embodiment of a customization cycle for customizing articles of footwear.

FIG. 2 depicts an exemplary embodiment of customization cycle 200, also referred to as a customization process or customization method. In FIG. 2, the steps discussed may be steps taken by a manufacturer, retailer, or other party. As used herein, a manufacturer may be any party that sells or otherwise provides articles to customers and which receives feedback (directly or indirectly) about the articles. It may be understood that steps of manufacturing could take place at a factory and/or at a retail facility (a store, kiosk, etc.). In some embodiments, a manufacturer may supply the raw parts and materials for manufacturing the articles. In other embodiments, a manufacturer may be provided with some prefabricated components that are then assembled (e.g., in a permanent manner) to form a final article.

Referring to FIG. 2, in one step 202 of customization cycle 200 a manufacturer may sell, or otherwise provide, new shoes (i.e., articles of footwear) to a user or customer. Next, during step or phase 204, the manufacturer may wait for a period of time until step 206 where feedback is received from the customer. The type and timing of the feedback may vary from one embodiment to another. Specifically, the type of feedback may be a function of the type of characteristics being evaluated and customized. The timing of the feedback may vary according to factors including the method of soliciting feedback from a customer, desired intervals before receiving feedback to ensure an appropriate amount of time to use the shoes, as well as preferences of the customer as to when they want to provide feedback. After step 206 where feedback is received, a manufacturer may enter a third step, or phase 208, during which time a new pair of customized shoes (i.e., articles of footwear) are made. The cycle then returns back to step 202 where the manufacturer sells another new pair of shoes to the customer, where the newest pair have been customized in some way to account for feedback received from the customer regarding the previously sold pair.

It is clear that customization cycle 200 is cyclical so that each step can occur multiple times over the lifetime of the customer-manufacturer (or customer-proprietor) relationship. In particular, and as discussed in further detail below, such a cycle provides for iterating customizable features in footwear until the point where a given customized feature has been deemed ideal, or close enough within some tolerance, for a user or customer. In other words, the cycle could be repeated 2, 3, 4, 5, 6, 7, 8, 9, 10, and up to N times, where N is any number. Moreover, the process repeated N times provides a user or customer with N or N+1 different pairs of footwear.

The time required to complete a cycle may vary and need not be constant between cycles. In some embodiments, a manufacturer may arrange for the process to be completed at regular intervals so that a new customized article is provided at regularly scheduled times. However, in other embodiments, the cycle length could vary according to how long the customer waits to provide feedback and/or how long before the customer orders a new pair of footwear. As seen in FIG. 2, phase 208 may be divided into first sub-phase 210 where a manufacturer has received feedback but has not received a new order, and second sub-phase 212 where the customer has placed an order for new shoes (step 214) and so the manufacturer can begin manufacturing the new customized pair of articles.

Although the embodiments discuss a method conducted by a manufacturer, in other embodiments the customization method described herein may more broadly be operated or conducted by a proprietor (or proprietors). A proprietor may include one or more factories, multiple offices, retailers, and various other establishments associated with a business. Generally, the term "proprietor," as used here, may also refer to distributors and/or suppliers. In other words, the term proprietor may also apply to various operations on the manufacturing side, including the operations responsible for parts, labor, and/or retail of the article of footwear, as well as other manufacturing side operations.

Figure 3:
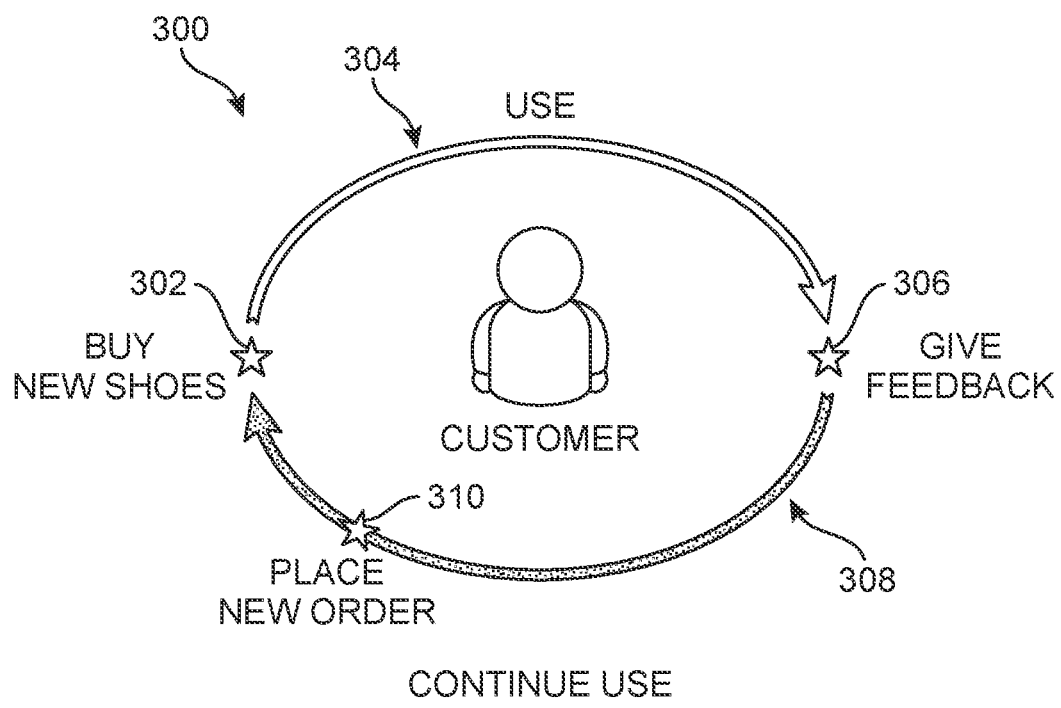
FIG. 3 is a schematic view of an embodiment of a customization cycle for using customized articles of footwear.

FIG. 3 is a schematic view of customization cycle 300 from the point of reference of a customer (or user). It may be appreciated that the steps (or phases) of customization cycle 200 (shown in FIG. 2) may correspond with customer-centric steps (or phases) of customization cycle 300. Referring to FIG. 3, a customer may buy new shoes during step 302 and proceed to wear/use them during phase 304. Once the customer has had sufficient time to evaluate one or more characteristics of the shoes, the customer may give feedback at step 306. During a subsequent phase 308, the customer may continue using the current pair of shoes. At some time during phase 308 (at step 310), the customer may place a new order for shoes. Finally, the cycle returns back to step 302 where the customer buys/receives a new pair of shoes that have been customized by the manufacturer according to the feedback received during step 306.

Figure 4:
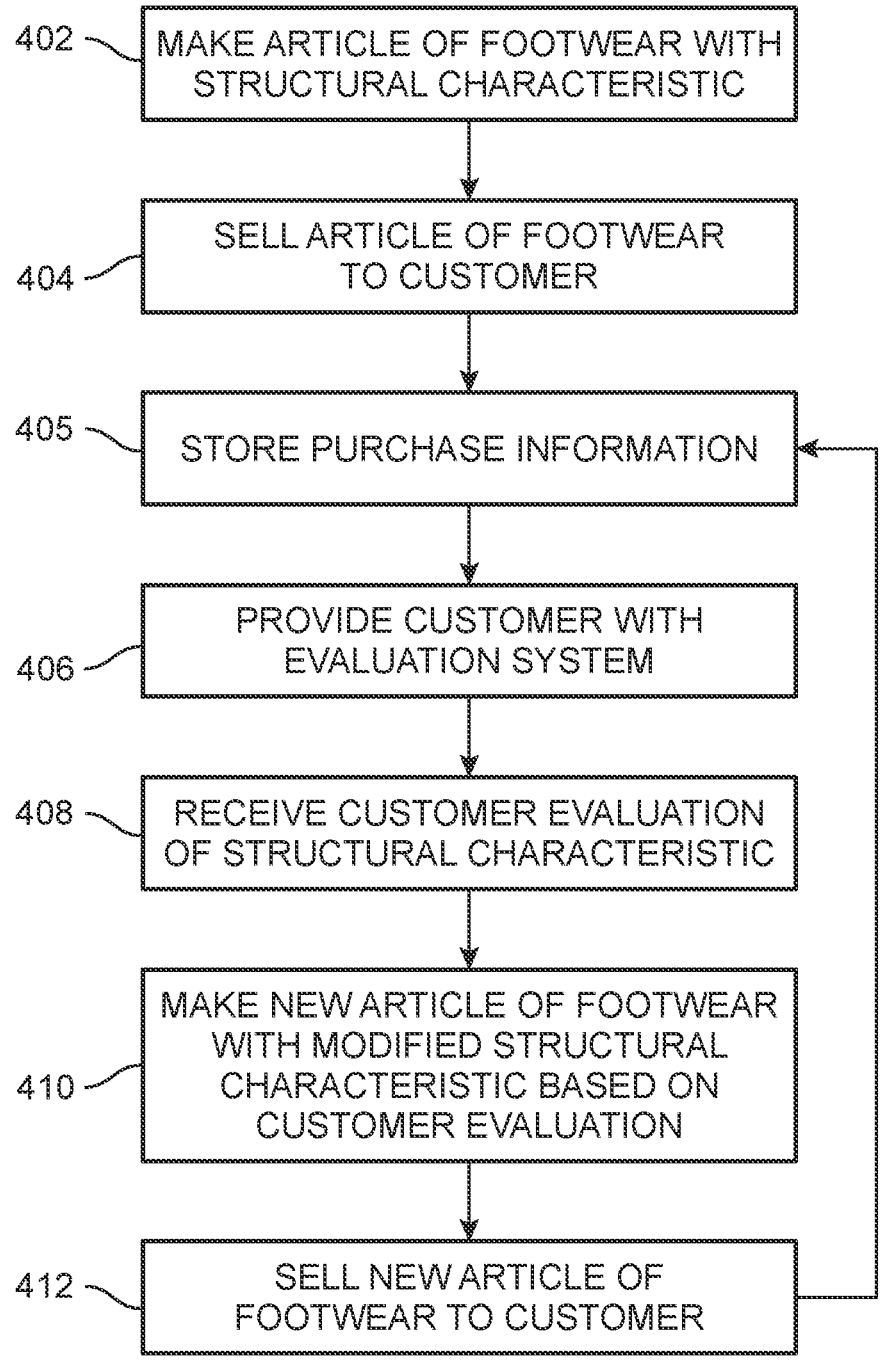
FIG. 4 is a schematic view of an embodiment of a process for customizing articles of footwear using customer feedback.

FIG. 4 illustrates an embodiment of a customization cycle that may be used by a manufacturer. In this embodiment, the following steps may be performed by the manufacturer; however in some embodiments, these steps may be performed by any other parties associated with a manufacturer. In addition, it will be understood that in other embodiments one or more of these steps may be optional.

Referring to FIG. 4, in first step 402, a manufacturer may make an article of footwear with a structural characteristic. The term "structural characteristic" as used throughout this detailed description and in the claims refers to any structural feature or property of an article of footwear. Exemplary structural characteristics or properties include, but are not limited to, cushioning (e.g., forefoot cushioning and heel cushioning in a sole), rigidity (e.g., sole rigidity), geometry (e.g., arch height or contouring), size (e.g., length and width), torsion, flexibility, shock absorption as well as any other structural characteristics of an article of footwear including features of the upper and/or sole.

Next, during step 404, a manufacturer may sell (or otherwise provide) an article of footwear to a customer. In some cases, this may be done directly, when, for instance, a customer purchases the footwear from a factory store or online from a manufacturer's website. In other cases, this may happen through an intermediary or third party, such as a retailer. In such cases, the step being performed by the manufacturer would be to provide the footwear to be sold to the customer by the third party (e.g., the retailer).

In step 405, the purchase information corresponding to the article of footwear sold during step 404 may be stored. In some embodiments, each purchase may be associated with customer identification information. The term "customer identification information" refers to any information that can be used to track a customer's purchases (and/or other information) over time. This information could include name, address, and/or other identifying information. In some embodiments, this information is stored in a database along with information regarding one or more purchases. For example, FIG. 1 illustrates a visualization of a customer's purchasing history, which may be stored in association with particular customer identification information for a particular customer. In the case shown in FIG. 1, this information includes at least a customer identification number (number 150). In other words, when an article has been sold to a customer in step 404, the manufacturer may designate the purchased article as being owned by (i.e., purchased by or sold to) a customer having a particular customer identification information. In situations where the article is sold to the customer via a third party, the third party (or the customer) may provide the manufacturer with information so as to designate the purchased article as being owned by that customer.

In step 406, a manufacturer may provide the customer with an evaluation system. The term "evaluation system" as used throughout this detailed description and in the claims refers to any system that can be used by a customer or user to evaluate one or more articles of footwear. In some embodiments, an evaluation system could comprise provisions for evaluating one or more features of an article of footwear, including one or more structural characteristics. An evaluation system can be comprised of one or more questions or statements that prompt a user to provide evaluation or feedback in the form of comments and/or selecting one or more of a predefined number of responses. The responses may take the form of qualitative indicators and/or quantitative indicators.

In some embodiments, an evaluation system may comprise a set of information necessary for a customer to make an evaluation of one or more structural characteristics of an article of footwear. For example, an evaluation system may incorporate questions, instructions, evaluation criteria, a scale or range of possible evaluations or ratings, as well as any other information required for a user to evaluate an article of footwear and provide evaluation information back to the manufacturer (or a third party). As discussed in further detail below, in at least some embodiments, an evaluation system is comprised of one or more physical resources that allow for a user to efficiently provide evaluations (or ratings) directly to the manufacturer. In one embodiment, shown in FIG. 9, an evaluation system includes at least a mobile computing device (e.g., a smartphone) that can run an application. By using the application, a customer can enter in evaluation information that can then be transmitted by the mobile device back to computing systems associated with the manufacturer.

In step 408, a manufacturer may receive a customer-selected evaluation (also referred to as a customer-selected rating). The term customer-selected evaluation, or customer-selected rating, may refer to any evaluation information received from a customer. Such information could include qualitative information about a particular characteristic of an article, such as "the article is too wide" or "the arch is too low." In some cases, a customer-selected evaluation is selected from a set of predefined evaluation values or ratings. For example, in prompting a user to evaluate the width of the article, an evaluation system could provide the following feedback options for the customer: "this article is too wide"; "this article is a little wide"; "this article fits perfectly"; "this article is a little narrow"; and "this article is too narrow." Exemplary embodiments are discussed in further detail below and shown in FIGS. 9-11.

Upon receiving customer evaluation information about one or more structural characteristics, a manufacturer may proceed to step 410. During step 410 a new article of footwear with a modified structural characteristic is made. Specifically, the new article has a structural characteristic with a value that is different from the value of the structural characteristic in the previously purchased article (step 404). This value may be different according to the customer-selected evaluation. For example, if a customer is providing feedback about the shoe width in the current pair of footwear, and the manufacturer receives evaluation information indicating that the width is too narrow, the manufacturer may then manufacture a new pair of footwear with a slightly wider width. With a new article having a new value for a particular structural characteristic (e.g., width or arch height) made, the new article (or pair of articles) may be sold to a customer during step 412.

At this point the cycle may continue, as the process returns back to step 405. At step 405, the manufacturer may store purchasing information designating the new article of footwear (or pair of articles) as being owned by the customer with the customer identification information used for storing the previous purchase information (in the previous pass through step 405). At this point, the process continues by providing the customer with the evaluation system (step 406). In cases where the user already has the system, they may be prompted to consult the system again for the new footwear—such as by opening a mobile application again to enter in evaluation information for the new article of footwear.

Figure 5:
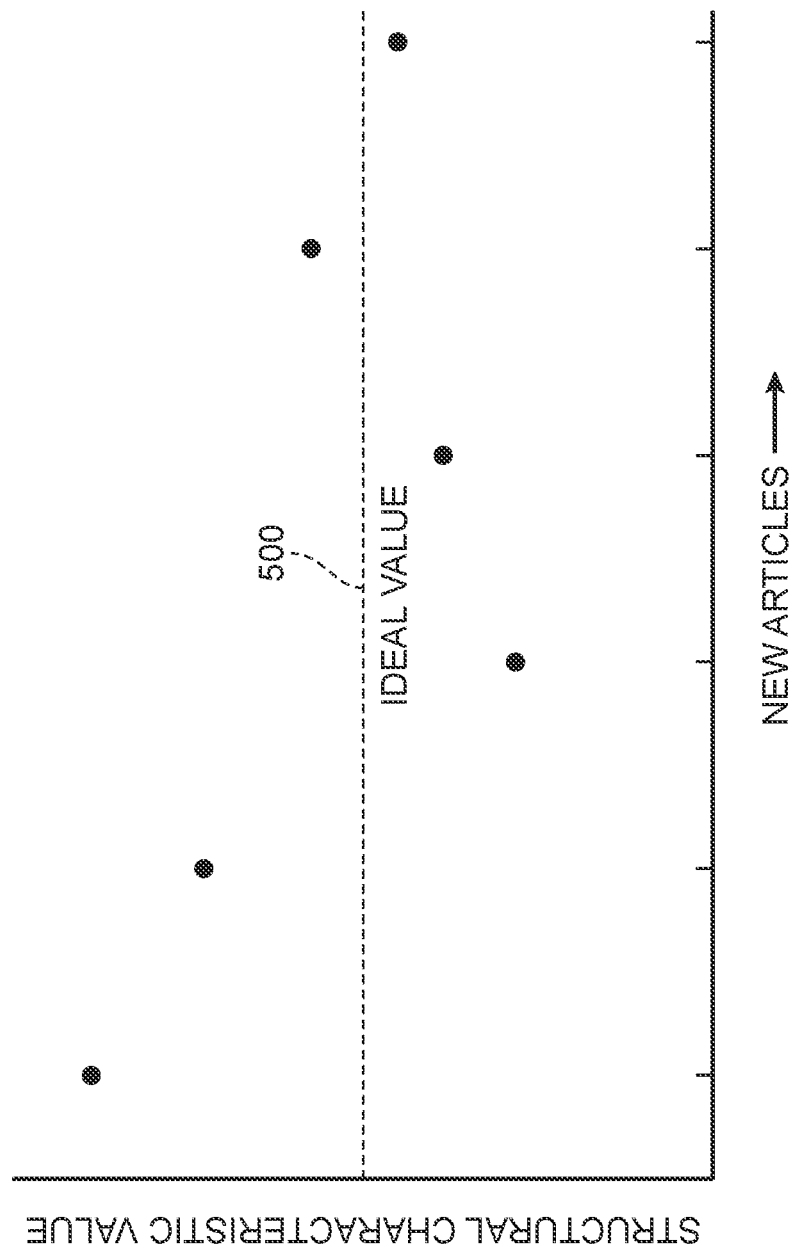
FIG. 5 is a schematic view of a relationship showing how a structural characteristic value changes over subsequent pairs of footwear purchased by the same customer, according to an embodiment.
Figure 6:
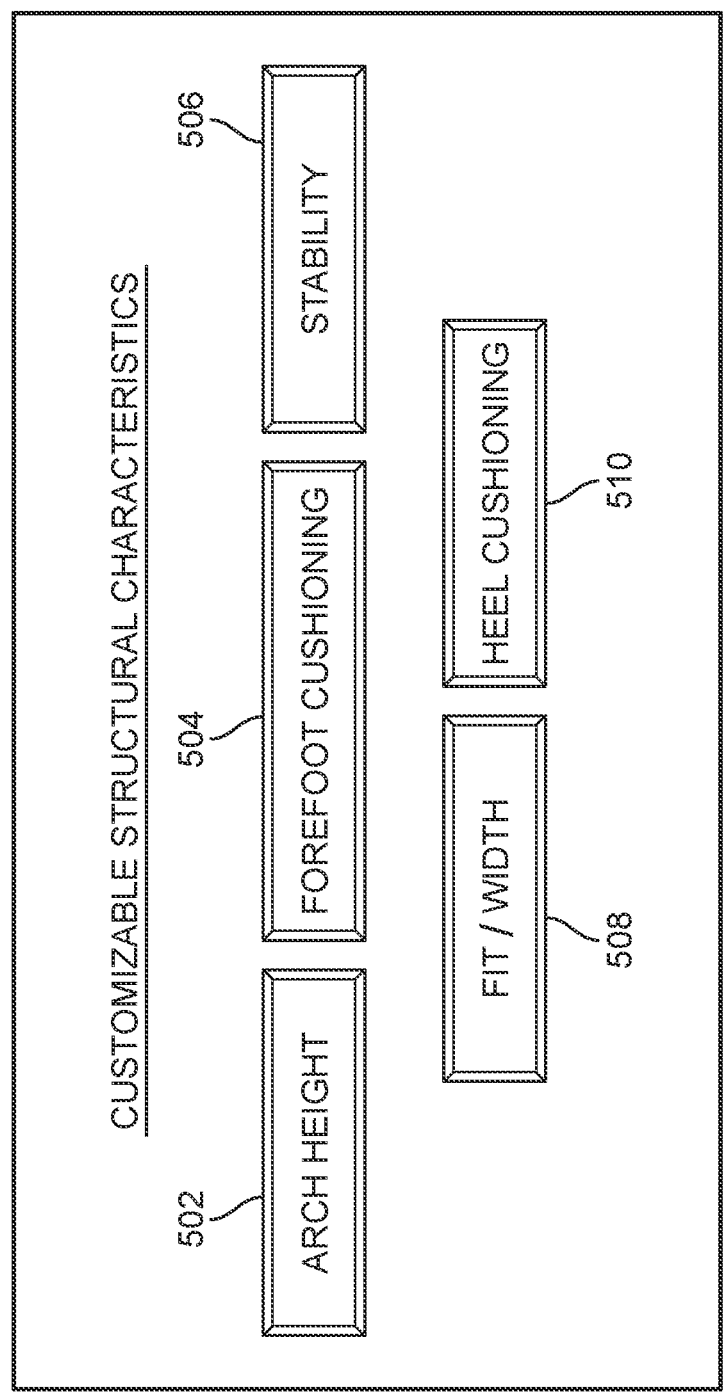
FIG. 6 is a schematic view of an exemplary set of customizable structural characteristics for an article of footwear.

FIG. 5 illustrates a chart showing the change in the value of a particular structural characteristic (e.g., width, arch height, cushioning, etc.) for a sequence of footwear manufactured using the customization cycle discussed above and shown in FIGS. 1-4. As one example, the structural characteristic could be width, and the particular value could be a value in a standardized foot width scale (such as a scale with discrete values of A, B, C, D, E, EE, EEE, EEEE, F, and G). In other cases, the structural characteristic could be arch height, and the values of the structural characteristic could be different arch heights measured in some selected unit (e.g., mm, cm, or inches). It may be appreciated, however, that a similar pattern or trend to the one shown in FIG. 5 may hold for any other structural characteristics as the value of the characteristic is varied according to user feedback or evaluation over many cycles (selling/purchasing cycles).

In FIG. 5, the values along the bottom or x-axis of the chart indicate different articles of footwear that have been manufactured over time (time increases toward the right). In this particular example, a dotted line has been provided to indicate an ideal value (constant value 500 in the chart) of the selected structural characteristic, such as the ideal width or arch height, for a given user. This ideal value is not necessarily known ahead of time, and may only be determined by providing a best fit of the data. This chart makes it clear that over time user feedback affects the value of the structural characteristic in a subsequent article of footwear, and does so in a way that allows the ideal value to be honed in on, or found, over time. Generally, each new article of footwear has a value for the structural characteristic that is closer to the ideal value than the values for previous articles.

It may be appreciated that some error between a given structural characteristic value for a particular article and the ideal value may always exist, as manufacturing efficiency makes it difficult to provide articles with any continuous value of a particular characteristic (e.g., width or arch height). However, the customization cycle is intended to operate so that over time this error is reduced to within at least some threshold or tolerance of an ideal value. Furthermore, the amount of error may also depend on how long the cycle is continued. For example, a customer that has gone through four or five cycles (i.e., purchased and provided feedback on four or five pairs of footwear) may generally find characteristic values that are closer to their ideal than a customer who has only gone through the cycle twice.

It may also be appreciated that the ideal value indicated in FIG. 5 could vary as a customer ages, loses weight, or otherwise changes over time. For example, a customer who initially prefers a high degree of cushioning in her running shoes may over time develop a preference for a lower degree of cushioning. The customization system discussed herein allows for subsequent articles to be adapted to fit the customer's changing preferences. Customers therefore need not worry about their particular shoe width or some absolute cushioning preference in selecting shoes—they can simply provide feedback about their desired width or cushioning levels relative to their current shoes.

Embodiments may include a customization cycle to optimize the value of any structural characteristic or other kind of characteristic (e.g., aesthetic characteristics). The embodiments of FIGS. 1-4 discuss modifying arch height and/or width/fit. However, other embodiments could include applying the customization cycle to any characteristics including any of the characteristics shown in FIG. 6. These include arch height 502, forefoot cushioning 504, stability 506, fit (or width) 508 and heel cushioning 510. In order to evaluate and make modifications to articles to customize these structural characteristics, embodiments can use a variety of provisions.

Some embodiments may include one or more of the methods, processes, structures, features and/or systems disclosed in: (a) Cook et al., U.S. patent application Ser. No. 15/055,113, filed Feb. 26, 2016, and titled "Method of Customizing Heel Cushioning in Articles of Footwear;" (b) Cook et al., U.S. patent application Ser. No. 15/055,129, filed Feb. 26, 2016, and titled "Method of Customizing Forefoot Cushioning in Articles of Footwear;" and/or (c) Cook et al., U.S. patent application Ser. No. 15/055,086, filed Feb. 26, 2016, and titled "Method of Customizing Stability in Articles of Footwear;" all of these applications are hereby incorporated by reference in their entirety.

It is to be understood that in different embodiments, one, two, or more different structural characteristics could be modified during a customization process. For example, in some embodiments both arch height and width could be evaluated and modified over subsequent pairs of footwear. Moreover, in at least some embodiments, arch height, forefoot cushioning, heel cushioning, fit/width, and/or stability could be modified for each new pair of footwear according to customer feedback regarding a previously sold pair of footwear.

Figure 7:
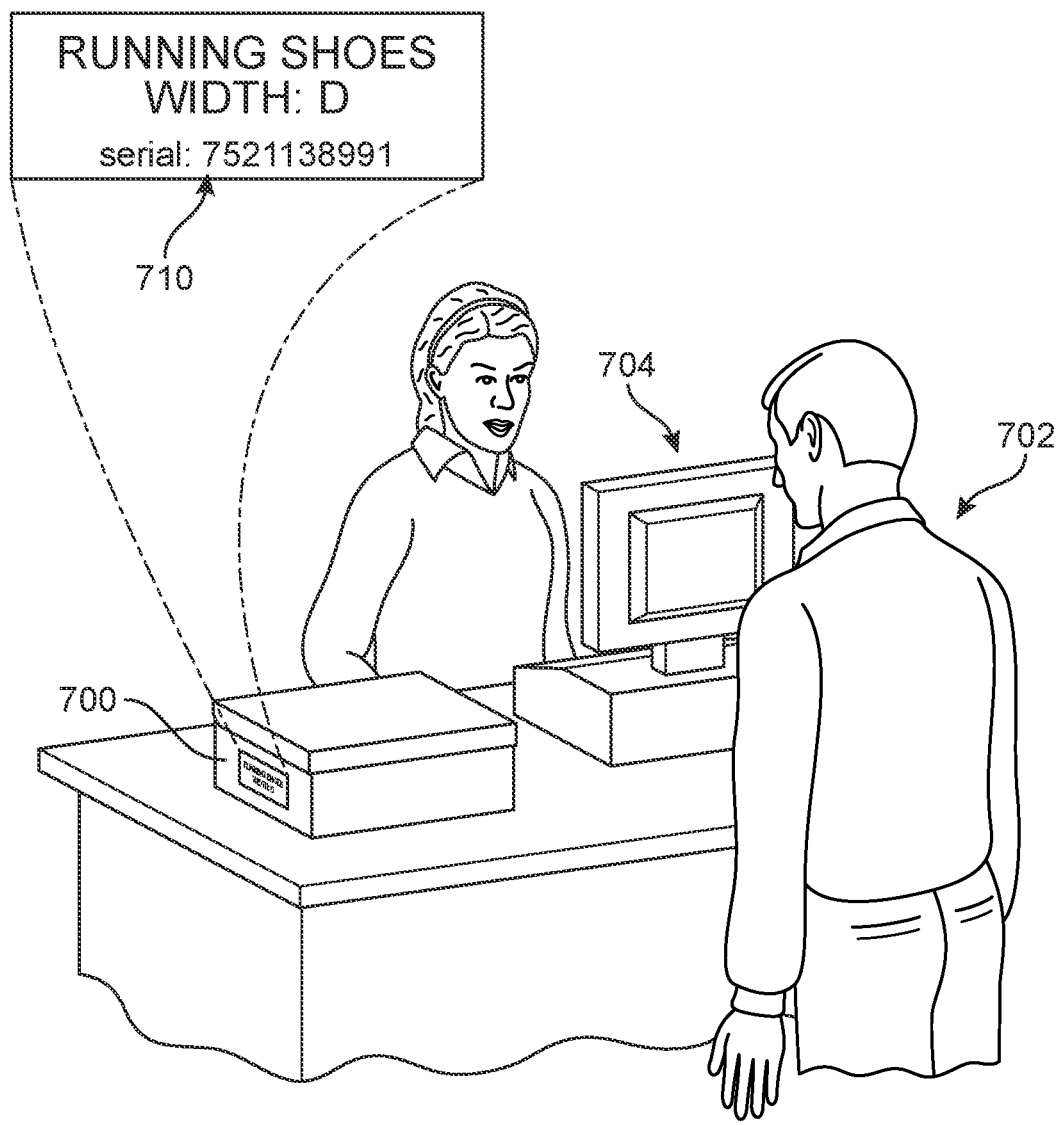
FIG. 7 is a schematic view of a customer purchasing a pair of footwear, according to an embodiment.

FIGS. 7-11 illustrate some exemplary steps in a customization cycle. Specifically FIGS. 7-11 illustrate at least some steps that may occur during a feedback portion of a customization cycle. In FIG. 7, customer 702 goes to a retailer to purchase, or pick up, a new pair of footwear (contained in shoe box 700). It may be appreciated that in other embodiments the article could be purchased online (using, for example, an online website provided by the manufacturer), at a factory store or at any other facility. Upon purchasing the new shoes, the retailer or other provider, may enter the purchasing information into computing system 704 so that the customer identification information associated with customer 702 is linked with the recent purchase. In some embodiments, the system could provide an association between the customer identification information (e.g., a customer identification number) and product serial number 710. In other embodiments, other product or purchasing information could be associated with the customer identification number.

Figure 8:
FIG. 8 is a schematic view of a customer wearing the pair of footwear of FIG. 7 and mentally evaluating the width, according to an embodiment.

In FIG. 8, customer 702 may be seen engaging in athletic activity. Here, customer 702 may be seen to be running. During this activity, the customer mentally notes that the shoes feel as though they are pinching the sides of his feet, and thus may be too narrow (or too tight in a widthwise direction). This though process is represented in bubble 720 in FIG. 8. This information may then inform the feedback provided by the customer to the manufacturer.

Although the exemplary embodiment depicts a customer running, a customer could try a variety of different athletic activities to evaluate different structural characteristics of an article. Moreover, the type of activity may be specifically selected according to an article's intended use. Thus, running shoes may generally be evaluated during running (as well as during casual use, such as walking and standing), while football cleats may be evaluated during football specific activities such as various drills or even during games. In some embodiments, an evaluation system may provide instructions or suggestions for a customer as to the best activities for evaluation according to the specific kind of footwear. In other embodiments, a customer may select preferred activities for evaluating structural characteristics of the footwear.

Evaluation can occur one or more times, and over any intervals or time periods. In some embodiments, a customer may evaluate a pair of footwear after a single use (e.g., a single run or a single sporting practice). In other embodiments, however, a customer may use the footwear many times before deciding on a final evaluation. For example, since some articles require a period of days to weeks of use to be fully "broken in," it may be beneficial for a customer to wait a predetermined period of time (or number of uses) before deciding on an evaluation. Moreover, in some cases, an evaluation system may be configured such that a customer is encouraged to submit multiple evaluations over time, thereby providing a more statistically robust measurement of the evaluation or rating. It can also be appreciated that in some embodiments, a customer could wait to provide an evaluation until he or she is about to place an order for a new pair of footwear. Thus, the feedback provided in the exemplary customization system can be one-time feedback or ongoing, and can occur throughout any time in the lifetime of the footwear.

Figure 9:
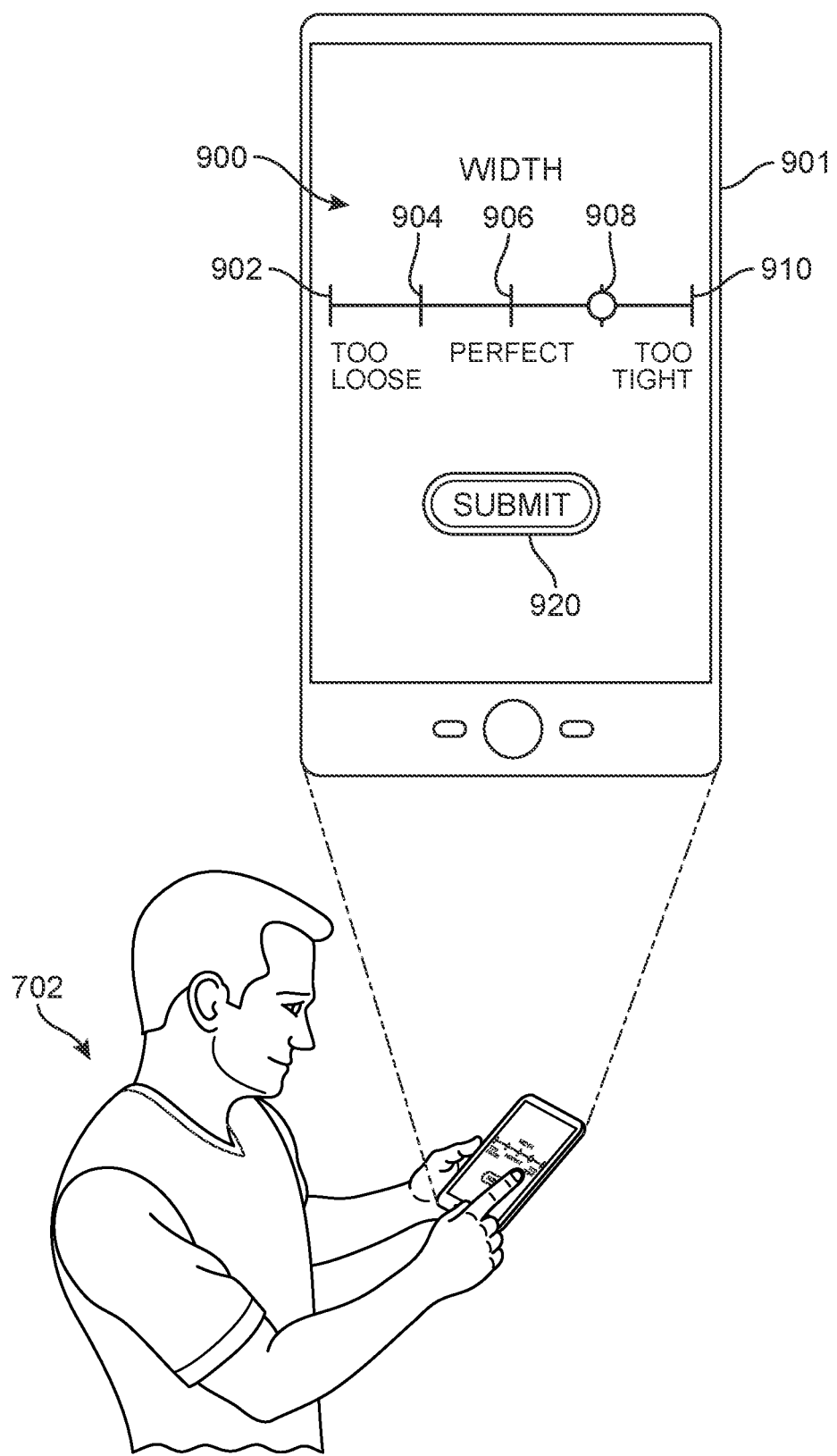
FIG. 9 is a schematic view of a customer using a mobile device application to submit feedback about the width of the article in FIG. 7 to a manufacturer, according to an embodiment.

FIG. 9 is a schematic view of customer 702 providing feedback about the width (or fit) of an article of footwear after customer 702 has had sufficient experience using the footwear to provide an accurate evaluation, according to an embodiment. In the depicted embodiment, the evaluation system is provided in the form of mobile device application 900 (running on mobile device 901). Thus, a customer can easily launch mobile device application 900 at any time, even immediately following a run or other activity, to provide feedback about the width. In this case, customer 702 has selected value 908 halfway between "perfect" and "too tight," which is consistent with the customer's experience of the shoe pinching his foot slightly as shown in FIG. 8. Upon pressing submit button 920, the customer selected value (value 908 in this case) may be sent to the manufacturer and used as information in manufacturing a subsequent article of footwear for customer 702.

In different embodiments, the set of evaluations that can be entered by a customer could vary. In some embodiments, a customer may have the option of entering any text, thereby providing a wide range of possible feedback that could be provided. In at least some embodiments, to facilitate efficient use of the feedback, an evaluation system could provide a set of predefined feedback values. In FIG. 9, the set of possible values for feedback are given as a discrete scale with five different options or values: value 902 ("too loose"), value 904 (midway between too loose and perfect fit), value 906 ("perfect"), value 908 (midway between perfect fit and too tight) and value 910 ("too tight"). Different embodiments could provide different resolutions for a scale, where a higher resolution scale corresponds to a larger number of available selections or values. In general, the number of selections or values available to a customer can depend on various factors including, but not limited to, manufacturing constraints (e.g., manufacturing costs and/or efficiency), as well as customer preferences (e.g., not wanting to overwhelm a customer with too many options).

It may be appreciated that in at least some embodiments, evaluations are provided as values relative to the current structural characteristic value (e.g., the value associated with the current articles own and worn by the customer). Thus, rather than asking a user to select a particular universal width value, footwear size, or cushioning designation (hard, medium, soft)—the evaluation system allows a customer to make a direct comparison with the current footwear. This comparison may be easier than expecting a customer to understand the absolute meanings of characterizations such as "hard, medium, or soft." In other embodiments, however, evaluation scales could use absolute values for one or more structural characteristics.

Figure 10:
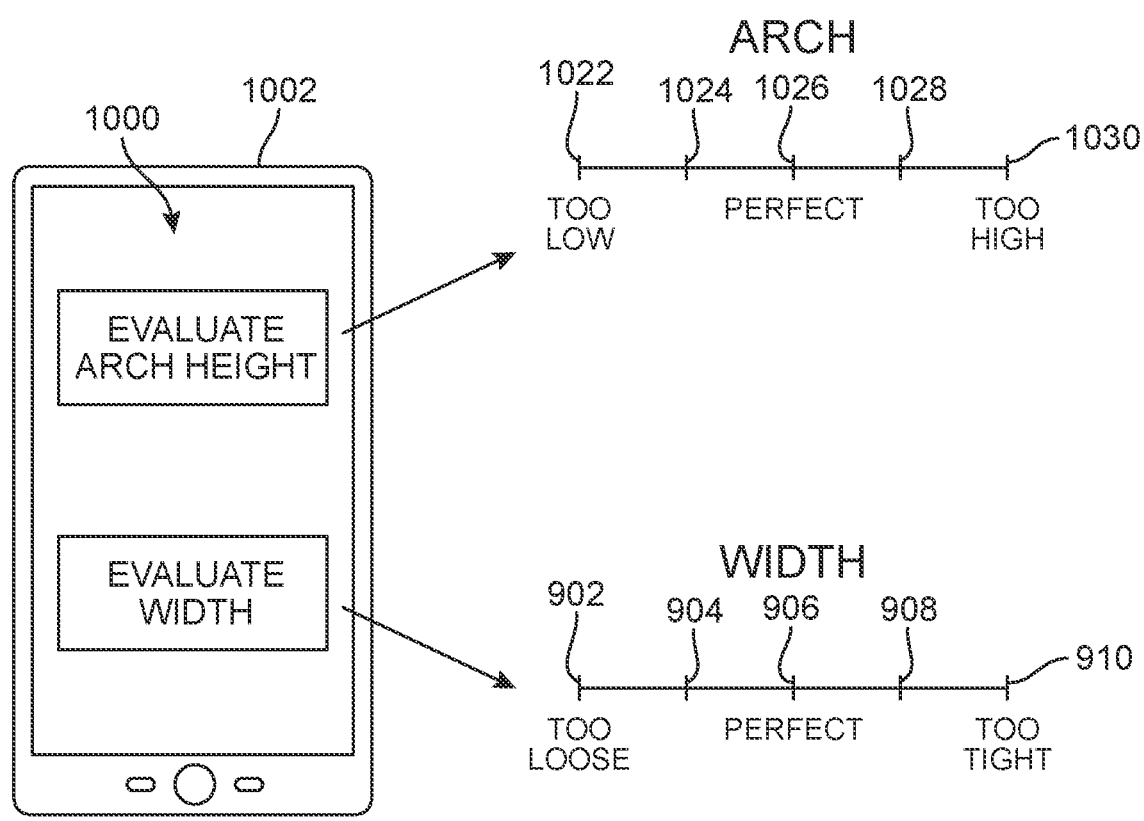
FIG. 10 is a schematic view of a mobile device application with options for evaluating two different structural characteristics, according to an embodiment.

FIG. 10 illustrates a schematic view of an embodiment where application 1000 running on mobile device 1002 may be used by a customer to provide feedback on at least two different structural characteristics: arch height and width. Thus, upon selecting either the "evaluate arch height" button or the "evaluate width" button a customer is provided with a corresponding scale from which to select a customer selected evaluation. As seen in FIG. 10, arch (height) scale 1020 includes five discrete values: value 1022 ("too low"), value 1024 (midway between "too low" and "perfect"), value 1026 ("perfect"), value 1028 (midway between "perfect" and "too high"), and value 1030 ("too high").

Figure 11:
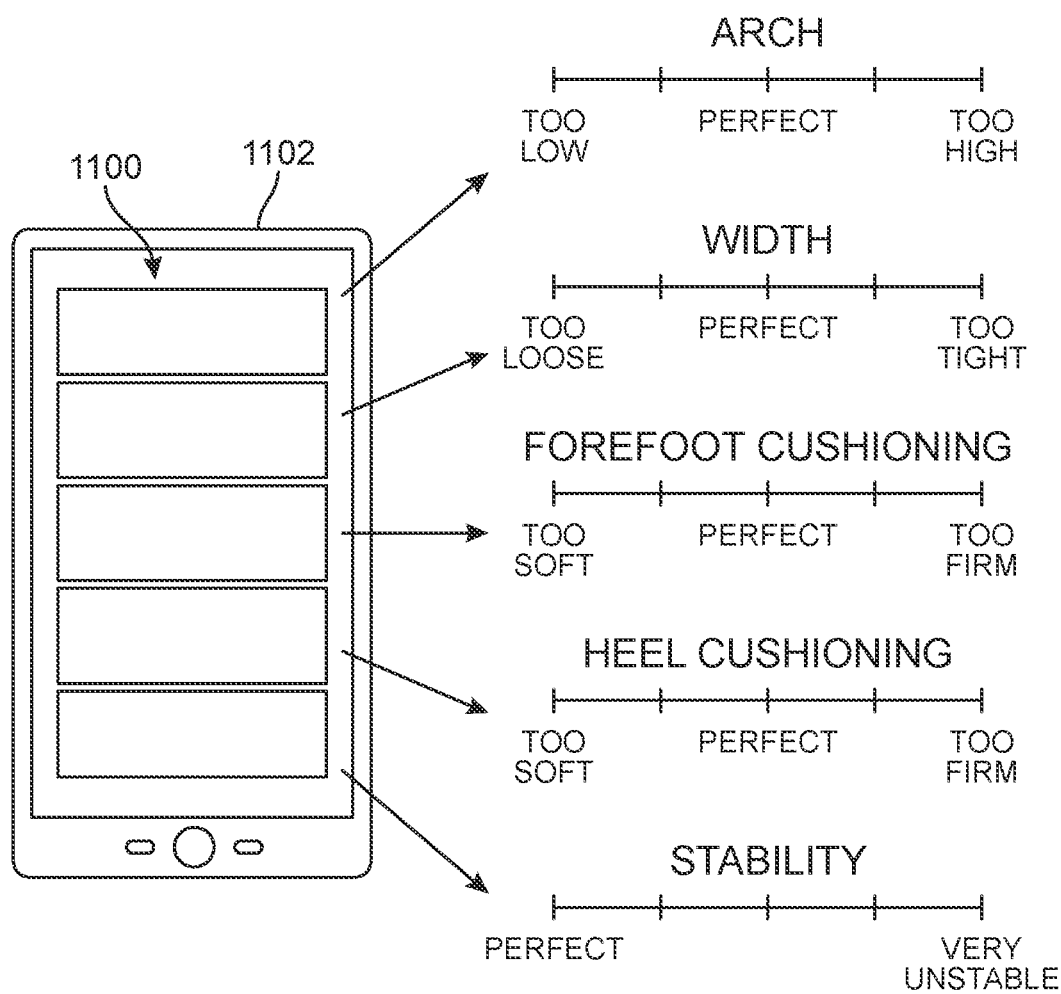
FIG. 11 is a schematic view of a mobile device application with options for evaluating five different structural characteristics, according to an embodiment.

FIG. 11 illustrates a schematic view of an embodiment where application 1100 running on mobile device 1102 may be used by a customer to provide feedback on at least five different structural characteristics. These include arch height, width, forefoot cushioning, heel cushioning, and stability, as previously discussed with reference to FIG. 6.

In some embodiments, each value on a feedback scale for a particular characteristic may correspond with a particular value of that characteristic that may be provided by a manufacturer. For example, a manufacturer may choose to provide five different widths of an article for a given shoe size. That is, in constructing a customized shoe for the user, the manufacturer has the option of providing one of five different widths for the article. In a situation where a customer receives the average, or typical, width, each possible selection from the evaluation scale for width could correspond with one of five possible widths. If, for example, the typical width is D, then a customer who selects "perfect" on arch (height) scale 1020 (see FIG. 10) may be given shoes with width D in subsequent purchases. If the user selects "too loose," the manufacturer may opt for providing the user with a subsequent pair of footwear that is two sizes narrower (i.e., a 2A width). In contrast, if a user selects a value between "too loose" and "perfect," the manufacturer may opt for providing the user with a subsequent pair of footwear that is one size narrower (i.e., a width B). Thus, for each unit on the scale away from "perfect" and toward "too loose," the manufacturer may choose to increase the width of the subsequent footwear by one width size. Likewise, for each unit on the scale away from "perfect" and toward "too tight," the manufacturer may choose to decrease the width of the subsequent footwear by one width size. Of course, there may be limitations to the maximum or minimum width that can be manufactured and provided in a shoe.

A similar situation may occur for other structural characteristics. The relative evaluations of a given structural characteristic may be used by the manufacturer to adjust the value of the structural characteristic in a subsequent pair of footwear by an amount corresponding to the relative deviation of the customer-selected value from "perfect."

In other embodiments, a manufacturer could use any other algorithm or rule for selecting the customized structural characteristic value (e.g., width value) for a new pair of footwear based on customer feedback about the currently owned/used footwear. In some other embodiments, the manufacturer could allow employees to use discretion in selecting a particular structural characteristic value according to customer feedback.

In embodiments where a predetermined number of customization options are available for each structural characteristic, the maximum number of unique customized articles that could be generated from the customization cycle is equal to the product of the number of different values for each of the characteristics. In other words, if a manufacturer is able to provide five different foot widths and five different arch heights to customers based on feedback, there are $5^2=25$ unique combinations of arch height and width. Likewise, if there are five possible values for five different structural characteristics (as exemplified in FIG. 11), there are $5^5=3125$ different articles having unique combinations of these various structural characteristic values. With this many different possibilities for customized articles, it is possible to tune or optimize the properties of the article to very specific and unique customer needs.

It may be appreciated that in some embodiments a customer could provide independent evaluation of each shoe (e.g., a right shoe and a left shoe), thereby allowing a manufacturer to provide articles customized to the left and right foot. In such cases, an evaluation system might allow a user to select a foot before providing feedback information, such as by prompting a user to first "select right foot or left foot to proceed to evaluation."

FIGS. 12-15 illustrate additional steps in a customization cycle, according to an embodiment. Specifically, FIGS. 12-15 illustrate steps of making and providing an article of footwear with structural characteristics that have been customized according to feedback.

Figure 12:
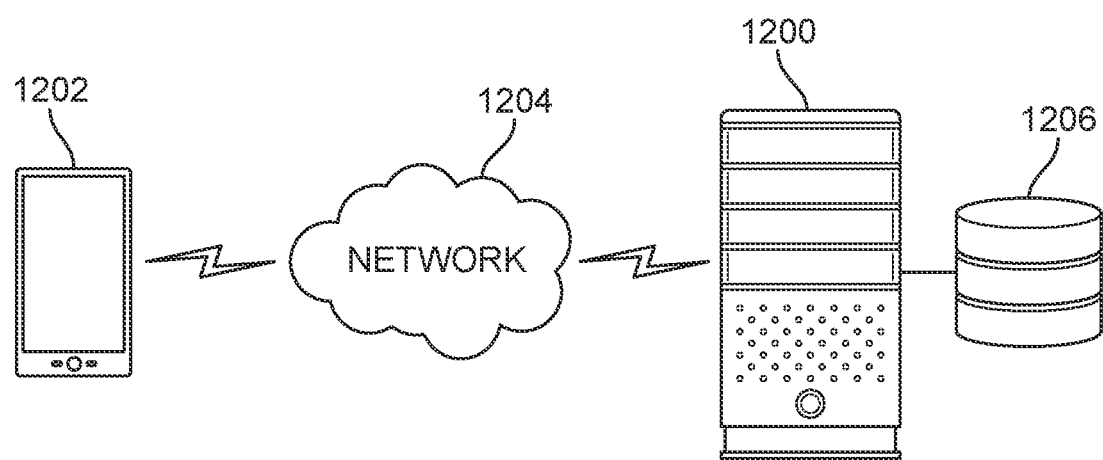
FIG. 12 is a schematic view of an embodiment of some components of a customization system for customizing articles of footwear using customer feedback.

FIG. 12 is a schematic view of some components of a customization system, according to an embodiment. Specifically, FIG. 12 includes various systems and devices that may be used to transmit and/or receive evaluation information as well as systems and devices for storing evaluations to be used in manufacturing customized articles.

Referring to FIG. 12, server 1200 may communicate with mobile device 1202 over network 1204. Server 1200 may provide information to, and/or receive information from, mobile device 1202. In some embodiments, for example, evaluation information, such as a customer-selected evaluation, may be transmitted by mobile device 1202 to server 1200 over network 1204. Upon receiving the evaluation information, server 1200 may store some or all of the information in database 1206. In particular, the evaluation information could be stored in one or more tables associated with a particular set of customer identification information. Furthermore, a manufacturer may access information in database 1206, such as evaluation information, when preparing to manufacture a new article of footwear for a customer that has provided the evaluation information and placed an order for a new pair of footwear.

Both server 1200 and mobile device 1202 may be considered more broadly as general "computing systems." Generally, the term "computing system" refers to the computing resources of a single computer, a portion of the computing resources of a single computer, and/or two or more computers in communication with one another. Any of these resources can be operated by one or more human users. In some embodiments, a computing system may include one or more servers. Computing systems may include a microprocessor, RAM, ROM, and software. Both current and electronically stored signals may be processed by a central processing unit (CPU) in accordance with software stored in an electronic memory, such as ROM. A computing system can also include one or more storage devices including, but not limited to, magnetic, optical, magneto-optical, and/or memory, including volatile memory and non-volatile memory.

Network 1204 may include any wired or wireless provisions that facilitate the exchange of information between mobile device 1202 and server 1200. In some embodiments, network 106 may further include various components such as network interface controllers, repeaters, hubs, bridges, switches, routers, modems, and firewalls. In some cases, network 106 may be a wireless network that facilitates wireless communication between two or more systems, devices, and/or components of a customization system. Examples of wireless networks include, but are not limited to, wireless personal area networks (including, for example, Bluetooth), wireless local area networks (including networks utilizing the IEEE 802.11 WLAN standards), wireless mesh networks, mobile device networks as well as other kinds of wireless networks. In other cases, network 106 could be a wired network including networks whose signals are facilitated by twister pair wires, coaxial cables, and optical fibers. In still other cases, a combination of wired and wireless networks and/or connections could be used.

Mobile computing devices can include, but are not limited to, smart phones and other cell phones, PDAs, tablets, laptops as well as possibly other devices. In some cases, mobile computing devices can run applications (or "apps") that operate natively on the computing device. In other cases, an application could be a web application configured to be run through a browser of a mobile computing device. In still other embodiments, an evaluation system could be run on a desktop computer or other non-mobile computing device. Such systems could run native applications or web applications using a browser.

In some embodiments, a customization system that includes various provisions for conducting a customization cycle or process may also include applications and user interfaces that allow for browsing, ordering, and purchasing articles of footwear independently from the evaluation process. Thus, for example, some embodiments of a customization system may include the resources (hardware and software) required to run and maintain a manufacturer's online store. In other embodiments, such provisions may be considered as separate from the customization system.

Figure 13:
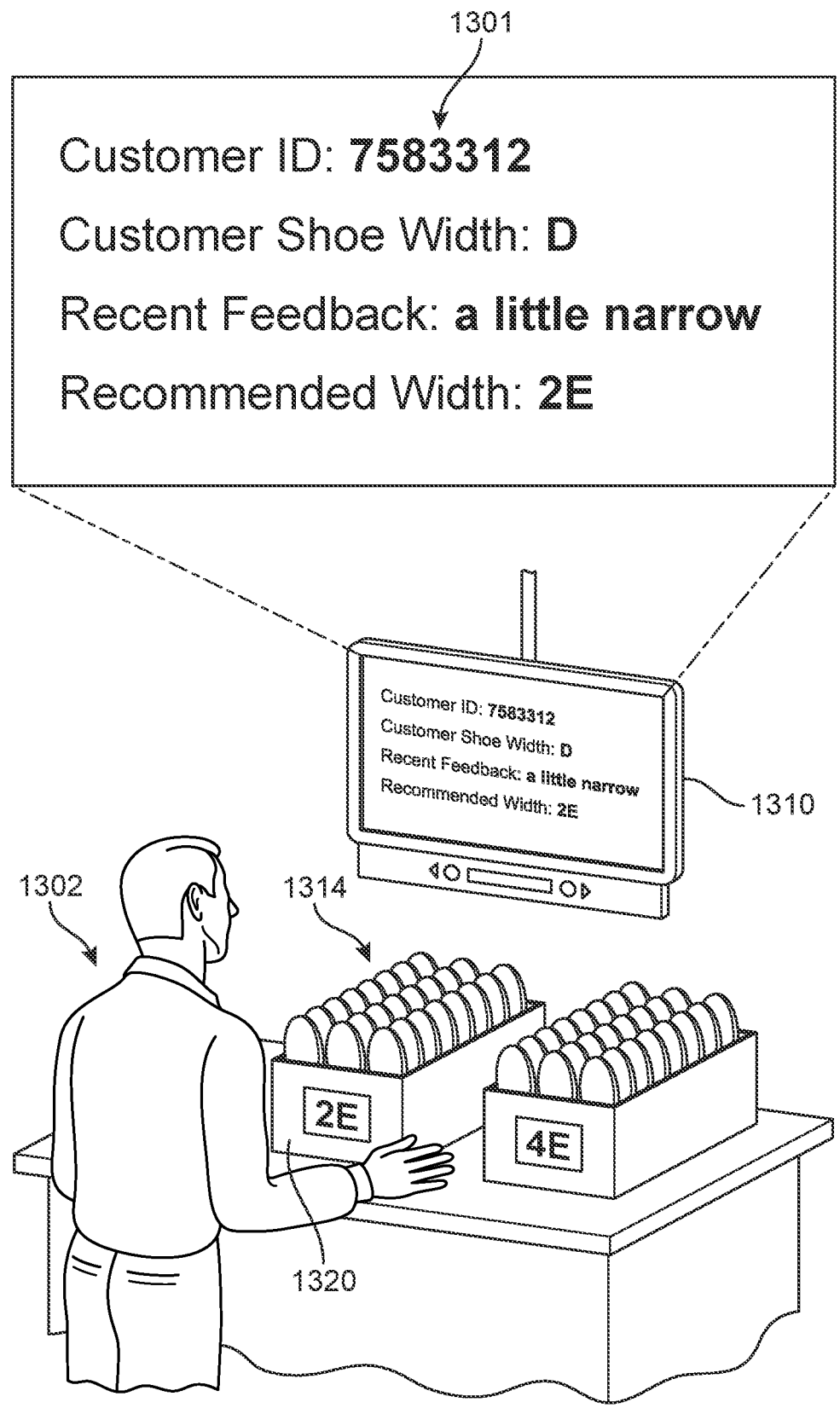
FIG. 13 is a schematic view of an embodiment of an employee selecting a sole for making a new customized article of footwear using feedback received from a customer.

In FIG. 13, employee 1302 may prepare to assemble an article of footwear for a customer associated with a given customer ID 1301. In this case, feedback information corresponding to the currently owned footwear for the customer is provided on screen 1310. As seen in FIG. 13, the customer currently owns footwear with shoe width D and has provided feedback that the shoe is "a little narrow." A modified shoe width (recommended shoe width 2E) has been automatically recommended by a component of the customization system (e.g., a feedback analysis algorithm). Thus, employee 1302 knows to choose a size 2E sole (i.e., one of soles 1314 from bin 1320) for assembly with an upper to make the customized article.

Figure 14:
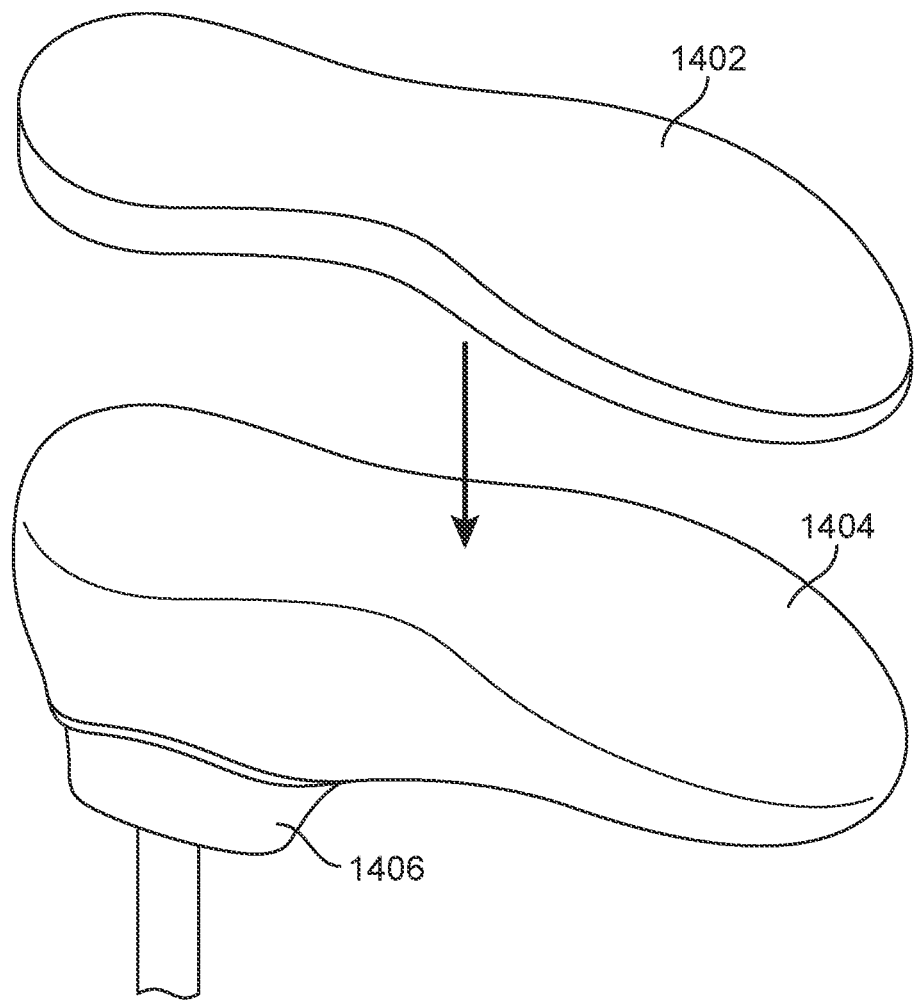
FIG. 14 is a schematic view of an embodiment of a sole being permanently attached to an upper.

FIG. 14 illustrates a schematic view of a step in the manufacturing process where sole 1402 is permanently attached (lasted) to upper 1404 that is disposed on last 1406. This permanent attachment can be achieved using any known methods for affixing a sole to an upper. Various known methods that may be used include, but are not limited to, slip lasting, strobel lasting, California lasting, combination lasting, and board lasting. In at least some embodiments, once sole 1402 has been attached to upper 1404, the two components cannot be separated without destroying some or all of one of the two components.

Figure 15:
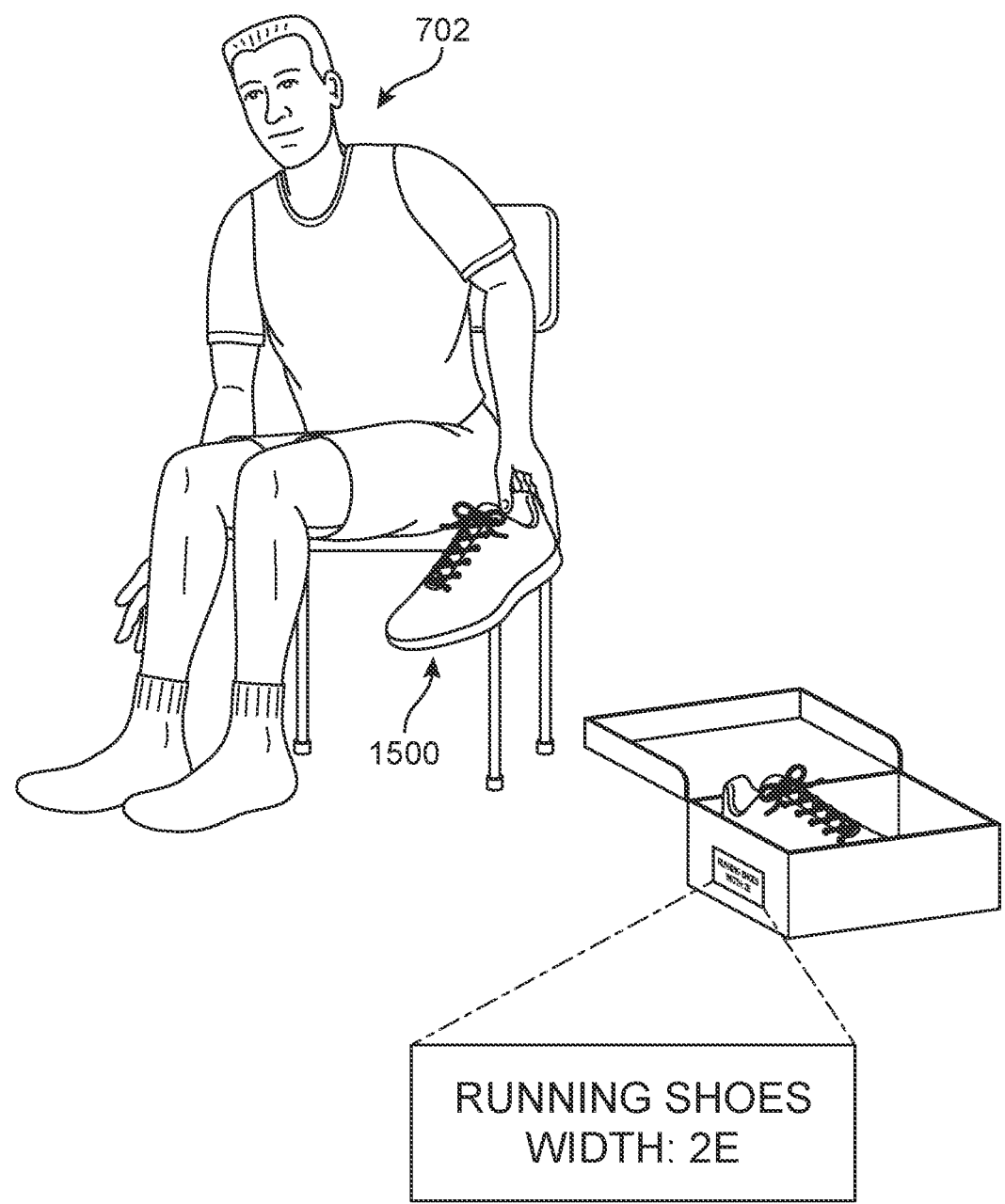
FIG. 15 is a schematic view of a customer receiving a new pair of customized footwear, according to an embodiment.

In FIG. 15, customer 702 receives the customized pair of footwear 1500. These articles have been specifically customized according to the feedback provided by customer 702 during the step shown in FIG. 9. In some embodiments, customized pair of footwear 1500 may have been ordered and purchased online and further delivered to a customer's house or other location. In other embodiments, customized pair of footwear 1500 may be ordered/purchased online or at a retail location and further received by the customer at the retail location.

Figure 16:
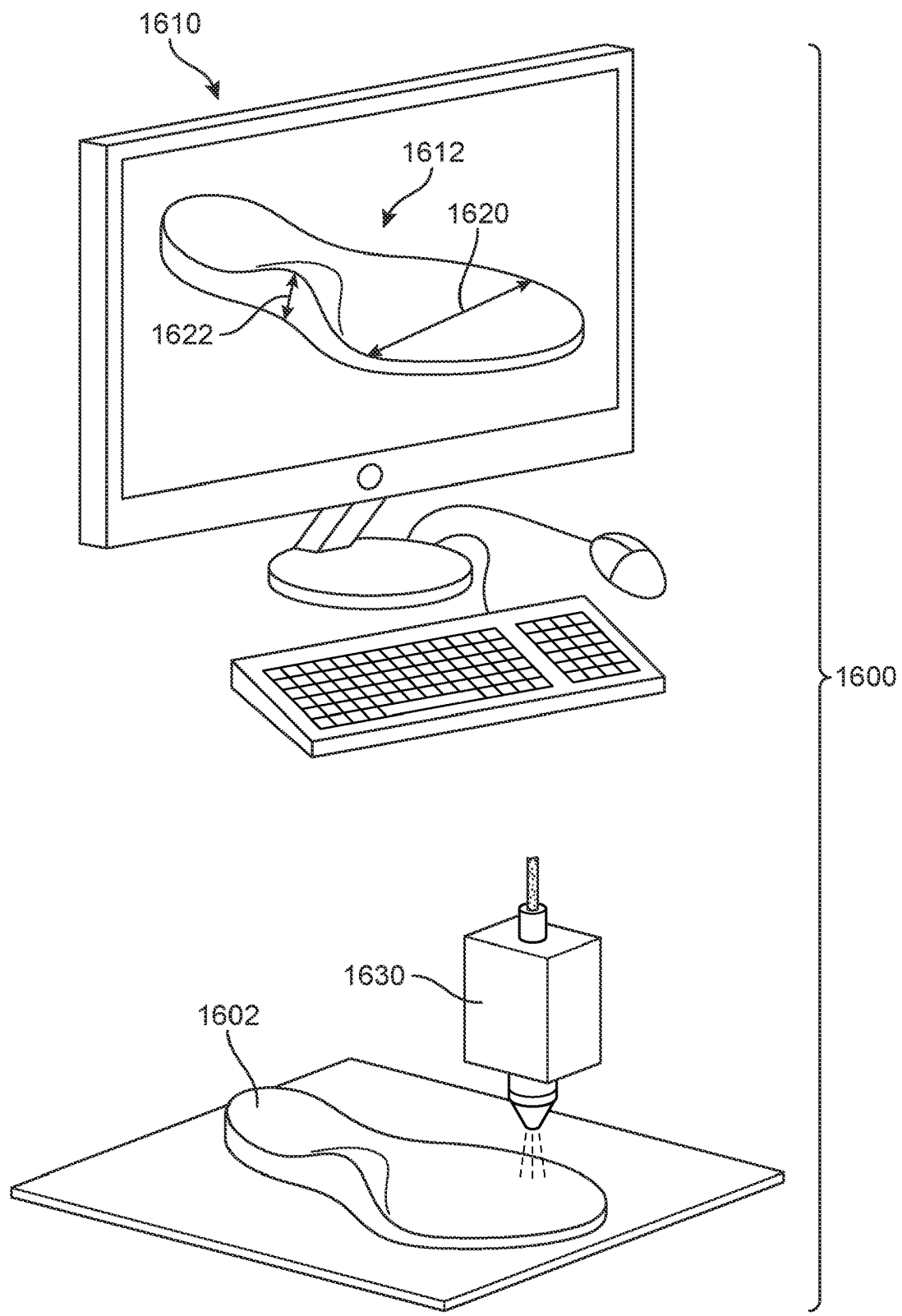
FIG. 16 is a schematic view of a step in a process of forming a sole using 3D printing techniques, according to an embodiment.

FIG. 16 illustrates an exemplary embodiment of another method of manufacturing a sole with a customized arch height and/or width. In some embodiments, additive printing system 1600 (or 3D printing system) could be used to custom build sole 1602 of any designated height and/or width. This may be in contrast to other methods where soles of different arch heights and/or widths are provided as stock-fit parts to be assembled with an upper during a lasting process. Such stock-fit parts may be manufactured using other methods for making soles including various kinds of molding methods.

Embodiments could use any 3D printing technologies to manufacture a sole with a particular width and/or arch height. In particular, embodiments may use any of the systems, components, devices, methods, and/or processes disclosed in Spanks, U.S. patent application Ser. No. 14/630,827, filed Feb. 25, 2015 and titled "Article of Footwear with a Lattice Sole Structure," the entirety of which is herein incorporated by reference.

In one exemplary embodiment, computing system 1610 may be used to provide customized sole design 1612 for use in the 3D printing of sole 1602. Specifically, customized sole design 1612 has customized width 1620 and customized arch height 1622 that have been selected according to feedback provided by a customer. Computing system 1610 may further control printhead 1630 to print sole 1602.

In the exemplary embodiments, the width of an article may be modified by using soles of different widths, either using stock-fit soles or 3D printed soles of desired sizes. However, other embodiments could also incorporate modifications into the design of an upper to account for changes in width. These could include modifications with the width of the upper pattern and/or adjusting the locations where an upper is bonded to a sole.

The customization process described herein is also not limited to use with identical styles and/or types of footwear. In particular, while some structural characteristics could vary greatly across different shoe types, others may be somewhat consistent across different shoe types. Thus, even if a customer first purchases a pair of running shoes and later a pair of hiking boots, he or she may still benefit from the customized width of the shoes achieved using the disclosed customization cycle. Likewise, values of arch height, stability, cushioning as well as other factors could be kept similar over different types and/or designs of footwear. Although, in some other embodiments, customers may select whether or not a given pair of articles should be considered for customization using the customization cycle.

Some embodiments can include provisions for modifying cushioning in the entirety of a sole member. In some embodiments, a sole member can be modified to provide uniform levels of cushioning in the forefoot, midfoot and heel regions of a sole member.

Figure 17:
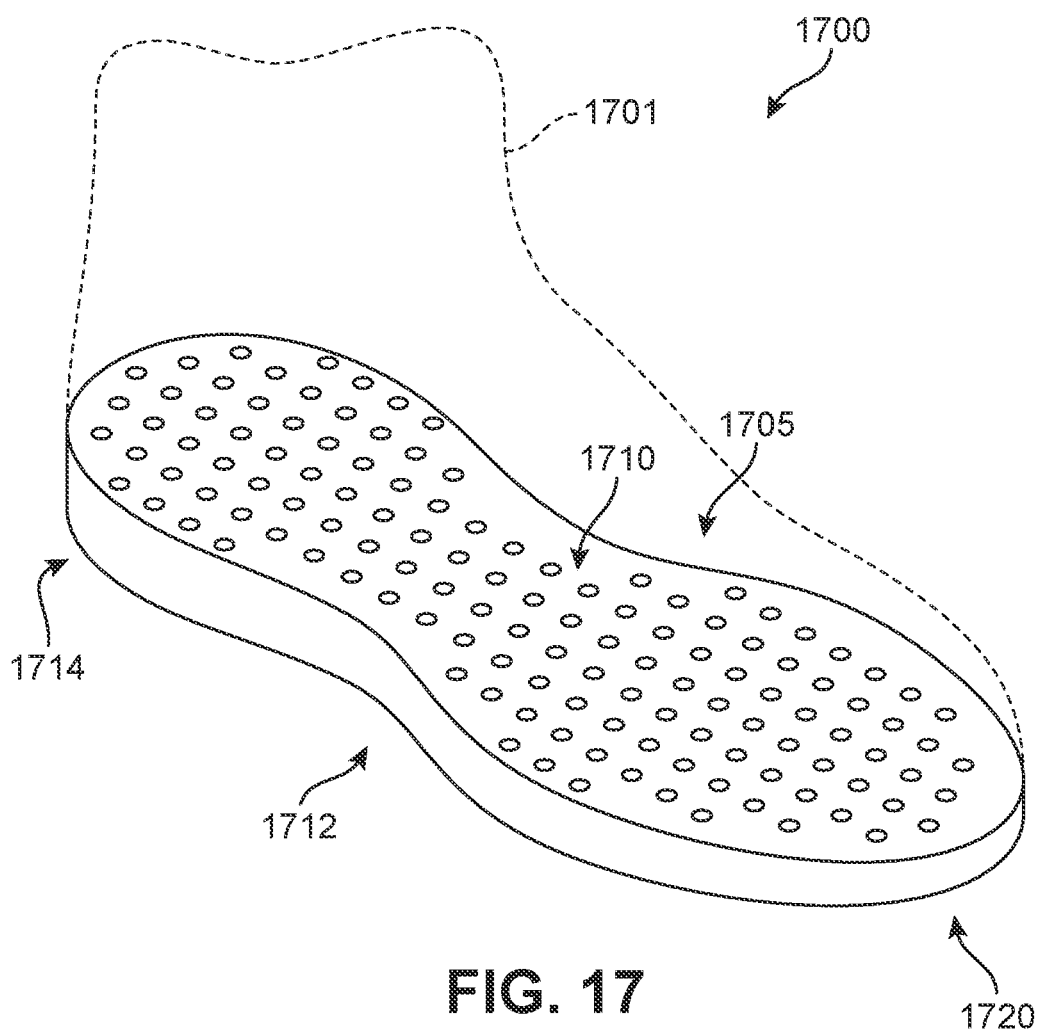
FIG. 17 is a schematic isometric view of an embodiment of an article with a sole member having apertures.

FIG. 17 illustrates a schematic view of an embodiment of a sole structure 1705 (which is part of an article 1700 having an upper 1701). Sole structure 1705 includes a pattern of apertures 1710 that have been applied to achieve a desired level of cushioning in response to user feedback. Specifically, apertures 1710 are seen to extend through forefoot region 1720, midfoot region 1722 and heel region 1724 of sole structure 1705. This pattern may provide a slightly modified level of cushioning through the entire sole as compared to the level of cushioning provided by an identical sole without any apertures on a top surface. Moreover, the exemplary pattern may provide an approximately constant level of cushioning through the length of the sole (i.e., a uniform cushioning level).

Figure 18:
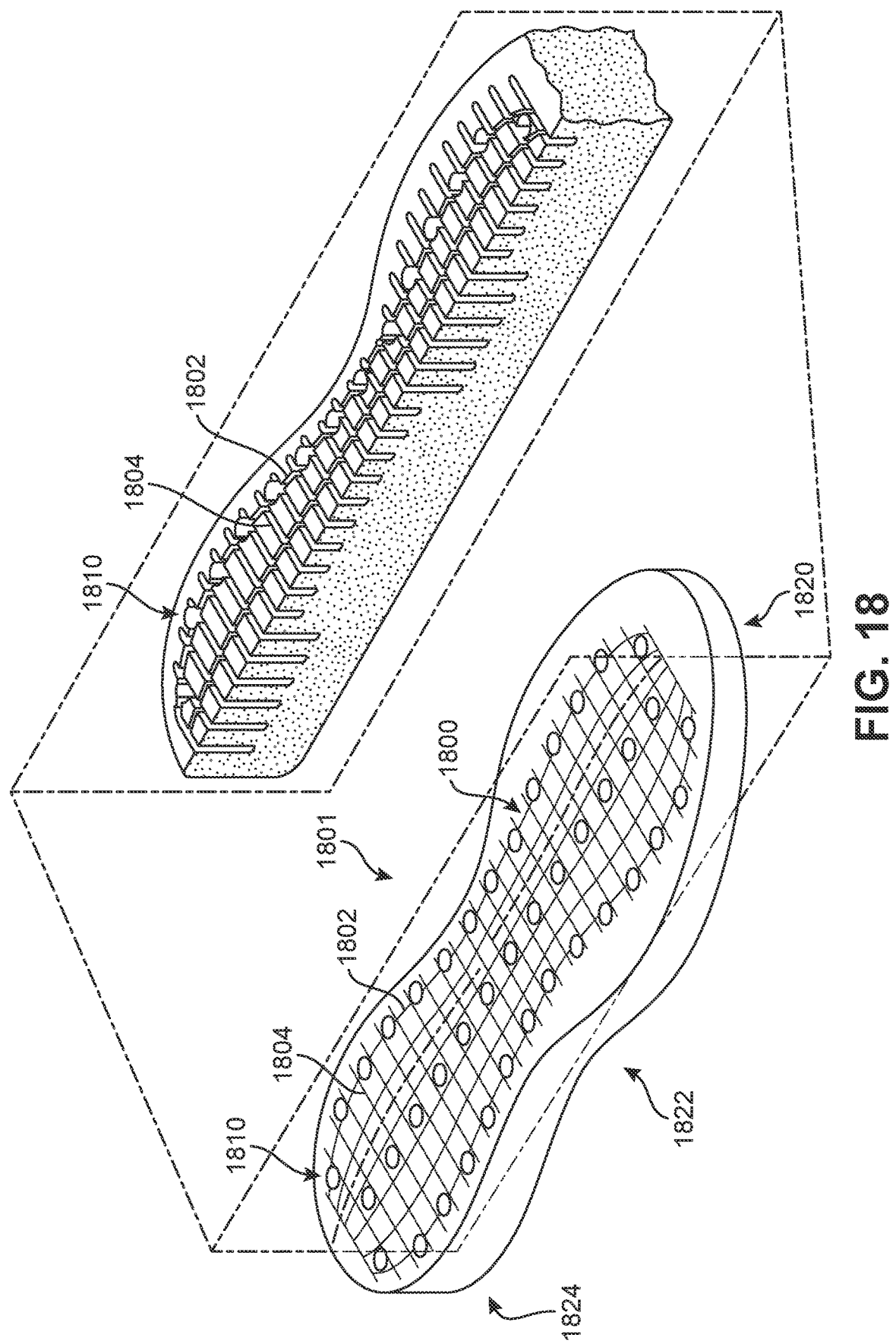
FIG. 18 is a schematic isometric view of an embodiment of a sole member with a grid-like incision pattern and a plurality of apertures.
Figure 19:
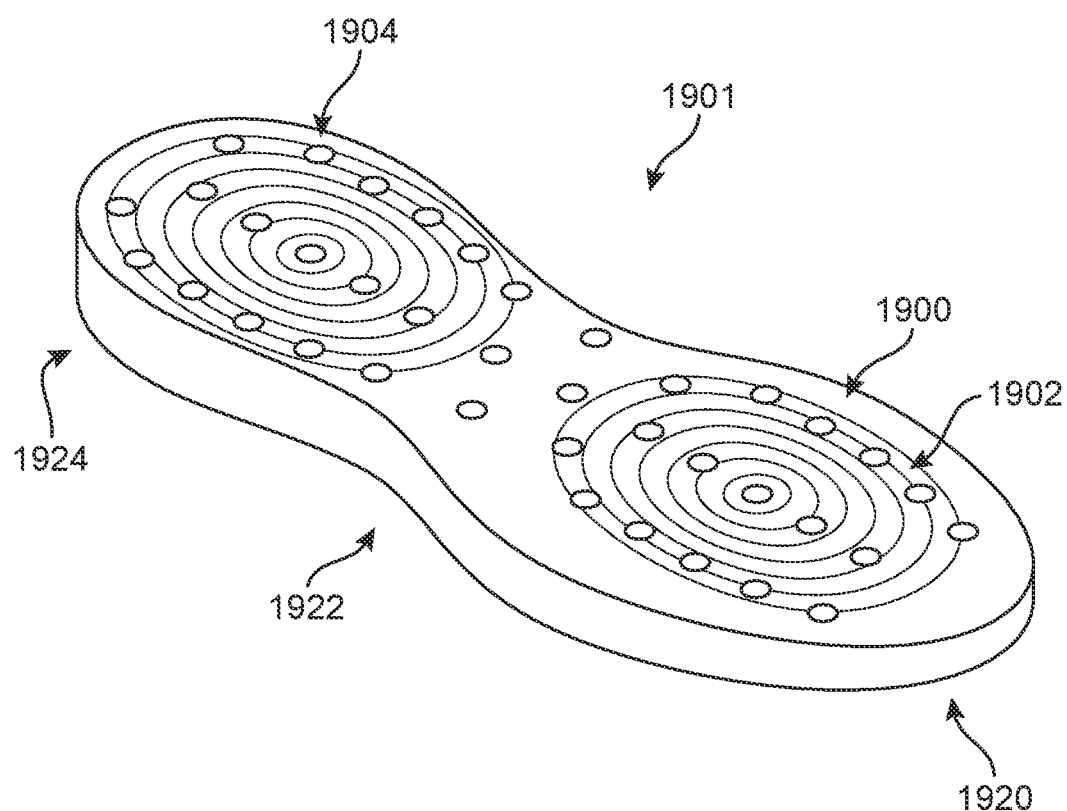
FIG. 19 is a schematic isometric view of an embodiment of a sole member with rounded incision patterns and a plurality of apertures.
Figure 20:
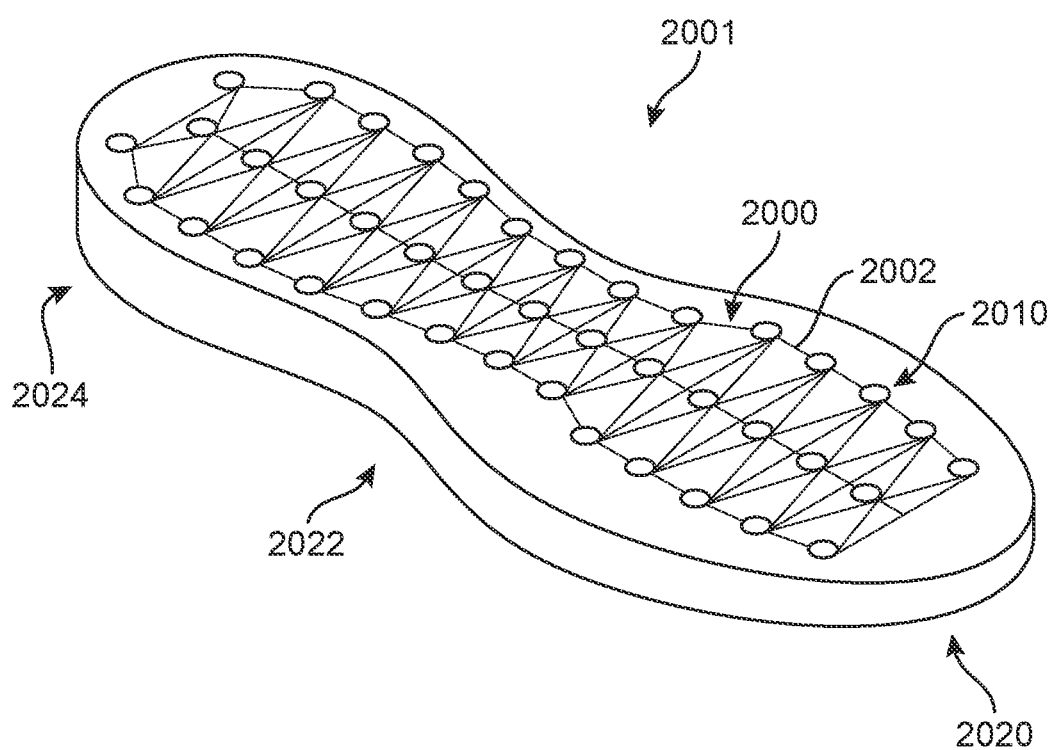
FIG. 20 is a schematic isometric view of an embodiment of a sole member with a lattice-like incision pattern and a plurality of apertures.

Still other embodiments could use other patterns throughout the length of the sole, including grid-like pattern 1800 shown in FIG. 18, rounded pattern 1900 shown in FIG. 19 and lattice-like pattern 2000 shown in FIG. 20. In FIG. 18, grid-like pattern 1800 of sole member 1801 may comprise longitudinal incisions 1802 and lateral incisions 1804 that intersect at approximately right angles, and which are disposed in forefoot region 1820, midfoot region 1822 and heel region 1824. Additionally, a plurality of rounded apertures 1810 are also disposed throughout forefoot region 1820, midfoot region 1822 and heel region 1824. In FIG. 19, rounded pattern 1900 of sole member 1901 may comprise two sets of concentric elliptic incisions 1902 and incisions 1904, which are located in forefoot region 1920 as well as heel region 1924 and may also partially extend into midfoot region 1922. Additionally, a plurality of rounded apertures 1910 are also disposed throughout forefoot region 1920, midfoot region 1922 and heel region 1924. In FIG. 20, lattice-like pattern 2000 of sole member 2001 may comprise incisions 2002 arranged in straight segments that intersect at various different angles (including non-right angles) and generally form triangular shapes within the surface of sole member 2001. Additionally, a plurality of rounded apertures 2010 are also disposed throughout forefoot region 2020, midfoot region 2022 and heel region 2024.

The patterns of FIGS. 18-20 incorporate both apertures and incisions in various patterns to help create desired levels of cushioning. Moreover, the embodiments could incorporate any of the apertures or incisions arranged in any patterns or configurations as disclosed in the Heel Cushioning application or in the Forefoot Cushioning application.

Figure 21:
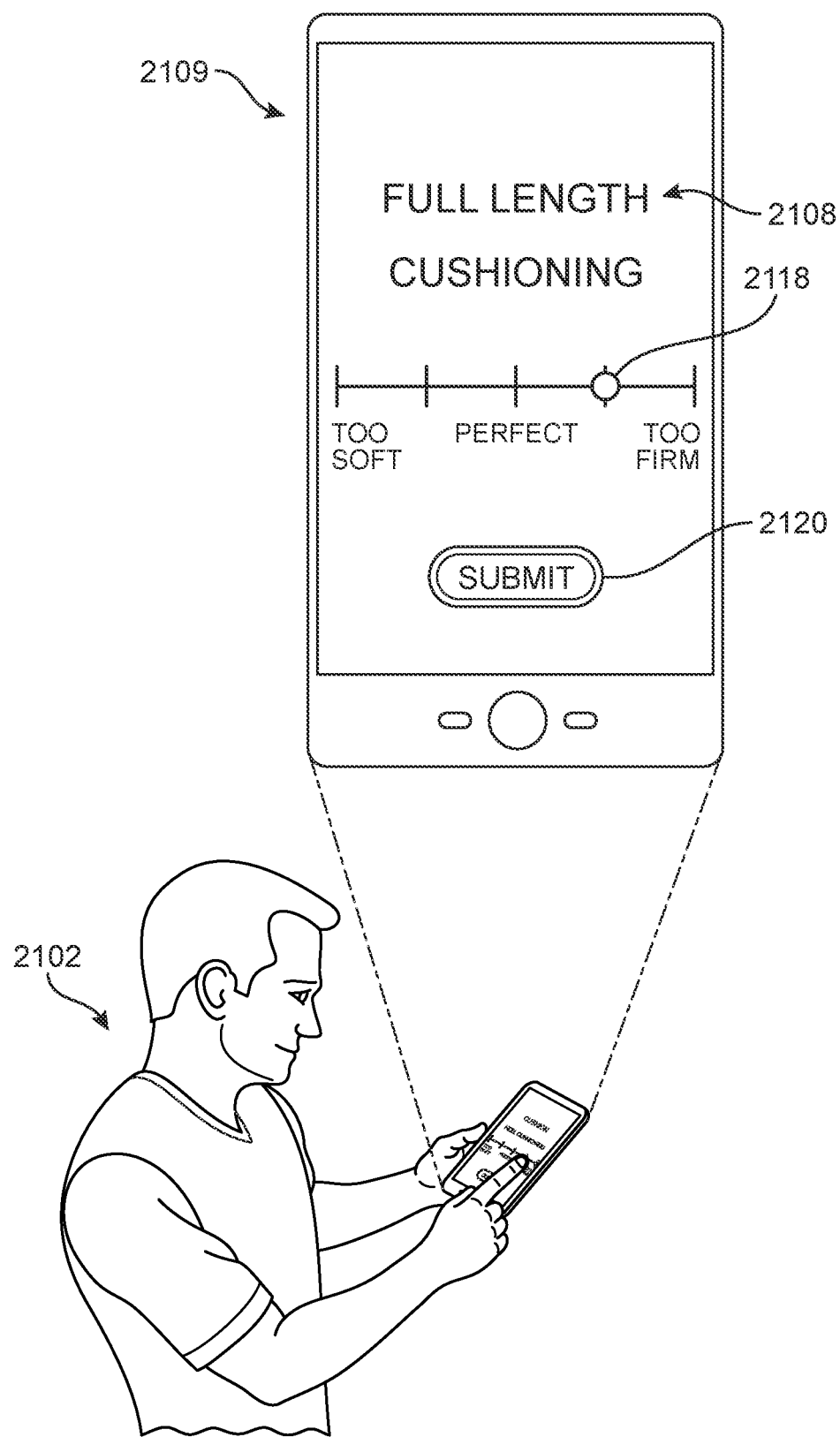
FIG. 21 is a schematic view of an embodiment of a user inputting an evaluation into an application associated with an evaluation system.

FIG. 21 illustrates a schematic view of a feedback system where a customer may provide feedback about the cushioning level of the entire sole, not only discrete regions (e.g., heel or forefoot). Referring to FIG. 21, customer 2102 provides feedback about the full length cushioning of an article of footwear after customer 2102 has had sufficient experience using the footwear to provide an accurate evaluation, according to an embodiment. In the depicted embodiment, the evaluation system is provided in the form of mobile device application 2108 (running on mobile device 2109). Thus, a customer can easily launch mobile device application 2108 at any time, even immediately following a run or other activity, to provide feedback about the full length cushioning. In this case, customer 2102 has selected value 2118 halfway between "perfect" and "too firm". Upon pressing submit button 2120, the customer selected value (value 2118 in this case) may be sent to the manufacturer and used as information in manufacturing a subsequent article of footwear for customer 2102.

Figure 22:
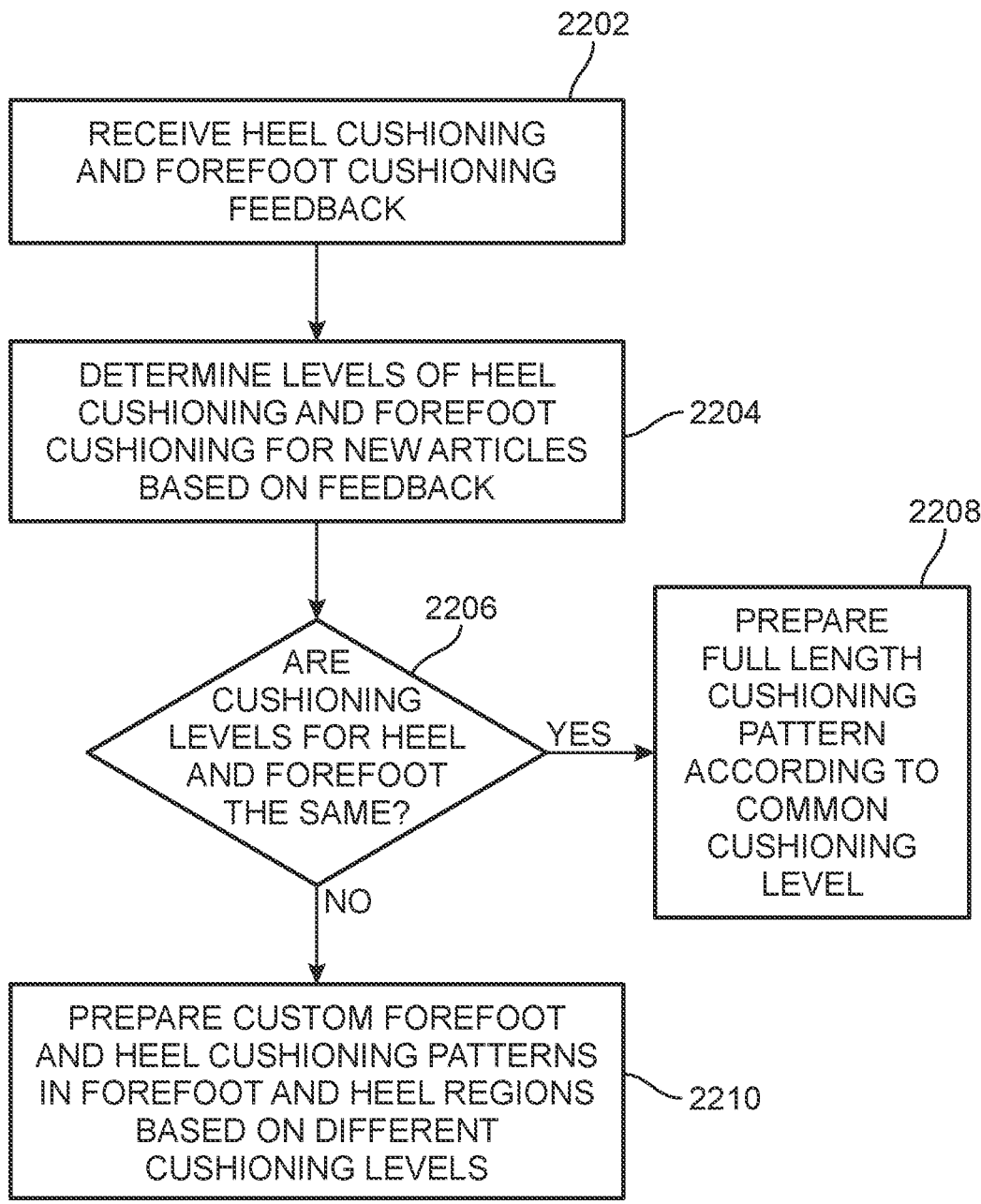
FIG. 22 is a schematic view of a process for applying cushioning in a sole member based on feedback, according to an embodiment.

FIG. 22 shows a schematic process for customizing a sole according to feedback received regarding the forefoot and heel regions. In step 2202, a manufacturer may receive heel cushioning and forefoot cushioning feedback, for example using one of the evaluation systems previously described. Next, in step 2204, a manufacturer may determine the levels of heel cushioning and forefoot cushioning to apply in a new article of footwear based on the feedback received in step 2202. Next, in step 2206, the manufacturer can check to see if the heel cushioning and forefoot cushioning levels are the same. If so, the manufacturer proceeds to step 2208 to modify the sole using a full length cushioning pattern. Alternatively, when the cushioning levels are different, the manufacturer may proceed to step 2210 to prepare custom forefoot and heel cushioning patterns based on the different cushioning levels required in the new footwear.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. A system for manufacturing customized articles of footwear, comprising:
   a computing system that receives input data including a customer-selected evaluation of a first structural characteristic of a first article of footwear, wherein the first article of footwear includes a first sole member with the first structural characteristic having a first value; and
   a second sole member for a second article of footwear, wherein a surface of the second sole member is modified to include a first pattern of apertures and/or incisions based on the customer-selected evaluation of the first structural characteristic to thereby modify the first structural characteristic of the second sole member to have a second value that differs from the first value;
   wherein the computing system stores information relating to the first article of footwear in a manner to associate the first article of footwear: (a) with a customer and (b) with a first specific iteration of a customization cycle associated with the customer;
   wherein the computing system further stores the customer-selected evaluation of the first structural characteristic in a manner to associate the customer-selected evaluation: (a) as being received from the customer and as relating to the first article of footwear and (b) as relating to the first specific iteration of the customization cycle; and
   wherein the computing system further stores information relating to the second article of footwear in a manner to associate the second article of footwear: (a) with the customer and (b) with a second specific iteration of the customization cycle associated with the customer.

2. The system according to claim 1, wherein the first pattern of apertures and/or incisions includes a grid pattern of incisions.

3. The system according to claim 2, wherein the grid pattern of incisions includes longitudinal incisions and lateral incisions that intersect and are disposed in a forefoot region, a midfoot region, and a heel region of the second sole member.

4. The system according to claim 3, wherein the first pattern of apertures and/or incisions further includes a plurality of rounded apertures disposed throughout the forefoot region, the midfoot region, and the heel region of the second sole member.

5. The system according to claim 1, wherein the first pattern of apertures and/or incisions included a rounded pattern of incisions.

6. The system according to claim 1, wherein the first pattern of apertures and/or incisions includes a first set of concentric elliptic incisions located in a forefoot region of the second sole member and a second set of concentric elliptic incisions located in a heel region of the second sole member.

7. The system according to claim 6, wherein the first pattern of apertures and/or incisions further includes a plurality of rounded apertures disposed throughout the forefoot region, the heel region, and a midfoot region of the second sole member.

8. The system according to claim 1, wherein the first pattern of apertures and/or incisions includes a lattice pattern of incisions.

9. The system according to claim 1, wherein the first pattern of apertures and/or incisions includes a lattice pattern of incisions including plural incisions arranged in straight segments that intersect at non-right angles and form triangular shapes within the surface of the second sole member.

10. The system according to claim 1, wherein the first structural characteristic constitutes a member selected from the group consisting of: arch height, forefoot cushioning, heel cushioning, stability, and width.

11. A system for manufacturing customized articles of footwear, comprising:
- a computing system that receives input data including customer-selected evaluations of a plurality of structural characteristics of a first article of footwear, wherein the first article of footwear includes a first sole member with a first set of structural characteristics; and
- a second sole member for a second article of footwear, wherein a surface of the second sole member is modified to include a first pattern of apertures and/or incisions based on the customer-selected evaluations of the plurality of structural characteristics to thereby modify the plurality of structural characteristics of the second sole member to have a second set of structural characteristics that differ from the first set of structural characteristics;
- wherein the computing system stores information relating to the first article of footwear in a manner to associate the first article of footwear: (a) with a customer and (b) with a first specific iteration of a customization cycle associated with the customer;
- wherein the computing system further stores the customer-selected evaluation of the plurality of structural characteristics in a manner to associate the customer-selected evaluation: (a) as being received from the customer and as relating to the first article of footwear and (b) as relating to the first specific iteration of the customization cycle; and
- wherein the computing system further stores information relating to the second article of footwear in a manner to associate the second article of footwear: (a) with the customer and (b) with a second specific iteration of the customization cycle associated with the customer.

12. The system according to claim 11, wherein the first pattern of apertures and/or incisions includes a grid pattern of incisions including longitudinal incisions and lateral incisions that intersect and are disposed in a forefoot region, a midfoot region, and a heel region of the second sole member.

13. The system according to claim 12, wherein the first pattern of apertures and/or incisions further includes a plurality of rounded apertures disposed throughout the forefoot region, the midfoot region, and the heel region of the second sole member.

14. The system according to claim 11, wherein the first pattern of apertures and/or incisions includes a first set of concentric elliptic incisions located in a forefoot region of the second sole member and a second set of concentric elliptic incisions located in a heel region of the second sole member.

15. The system according to claim 14, wherein the first pattern of apertures and/or incisions further includes a plurality of rounded apertures disposed throughout the forefoot region, the heel region, and a midfoot region of the second sole member.

16. The system according to claim 11, wherein the first pattern of apertures and/or incisions includes a lattice pattern of incisions.

17. The system according to claim 11, wherein the first pattern of apertures and/or incisions includes a lattice pattern of incisions including plural incisions arranged in straight segments that intersect at non-right angles and form triangular shapes within the surface of the second sole member.

18. The system according to claim 11, wherein the plurality of structural characteristics include two or more of arch height, forefoot cushioning, heel cushioning, stability, and width.

* * * * *